(12) United States Patent
Choi

(10) Patent No.: US 11,354,826 B2
(45) Date of Patent: Jun. 7, 2022

(54) SYSTEMS AND METHODS FOR AUGMENTED REALITY ENVIRONMENTS AND TOKENS

(71) Applicant: Daniel Choi, Yorba Linda, CA (US)

(72) Inventor: Daniel Choi, Yorba Linda, CA (US)

( * ) Notice: Subject to any disclaimer, the term of this patent is extended or adjusted under 35 U.S.C. 154(b) by 0 days.

(21) Appl. No.: 17/464,610

(22) Filed: Sep. 1, 2021

(65) Prior Publication Data

US 2022/0067984 A1 Mar. 3, 2022

Related U.S. Application Data

(60) Provisional application No. 63/145,317, filed on Feb. 3, 2021, provisional application No. 63/073,684, filed on Sep. 2, 2020.

(51) Int. Cl.
| | |
|---|---|
| *G06T 11/00* | (2006.01) |
| *A63F 13/65* | (2014.01) |
| *A63F 13/79* | (2014.01) |
| *G06F 16/27* | (2019.01) |
| *H04L 9/32* | (2006.01) |

(52) U.S. Cl.
CPC ............. *G06T 11/00* (2013.01); *A63F 13/65* (2014.09); *A63F 13/79* (2014.09); *G06F 16/27* (2019.01); *H04L 9/3239* (2013.01); *A63F 2300/5546* (2013.01); *A63F 2300/69* (2013.01); *H04L 2209/38* (2013.01)

(58) Field of Classification Search
CPC .......... G06T 11/00; A63F 13/65; A63F 13/79; A63F 2300/5546; A63F 2300/69; G06F 16/27; H04L 9/3239; H04L 2209/38
USPC ........................................................ 345/633
See application file for complete search history.

(56) References Cited

U.S. PATENT DOCUMENTS

| | | | |
|---|---|---|---|
| 10,505,726 B1 | 12/2019 | Andon et al. | |
| 2018/0015081 A1 | 5/2018 | Lee et al. | |
| 2019/0099678 A1* | 4/2019 | Khan | G06T 11/60 |
| 2019/0354765 A1* | 11/2019 | Chan | H04N 21/23418 |
| 2020/0074181 A1* | 3/2020 | Chang | G06K 9/00744 |
| 2020/0193163 A1* | 6/2020 | Chang | G06F 3/013 |

\* cited by examiner

*Primary Examiner* — Khoi V Le

(74) *Attorney, Agent, or Firm* — Foley & Lardner LLP

(57) ABSTRACT

In some aspects, the disclosure is directed to methods and systems for generating an augmented reality environment. An application executing on a computing device may receive a real-time video feed. The application may present the real-time video feed on a display of the computing device. The application may identify an image on a physical token from the real-time video feed. The application may select an animation from a set of one or more animations based on the identified image. The application may add the animation to the real-time video feed at an animation position above the physical token. The application may present the real-time video feed with the added animation.

19 Claims, 16 Drawing Sheets

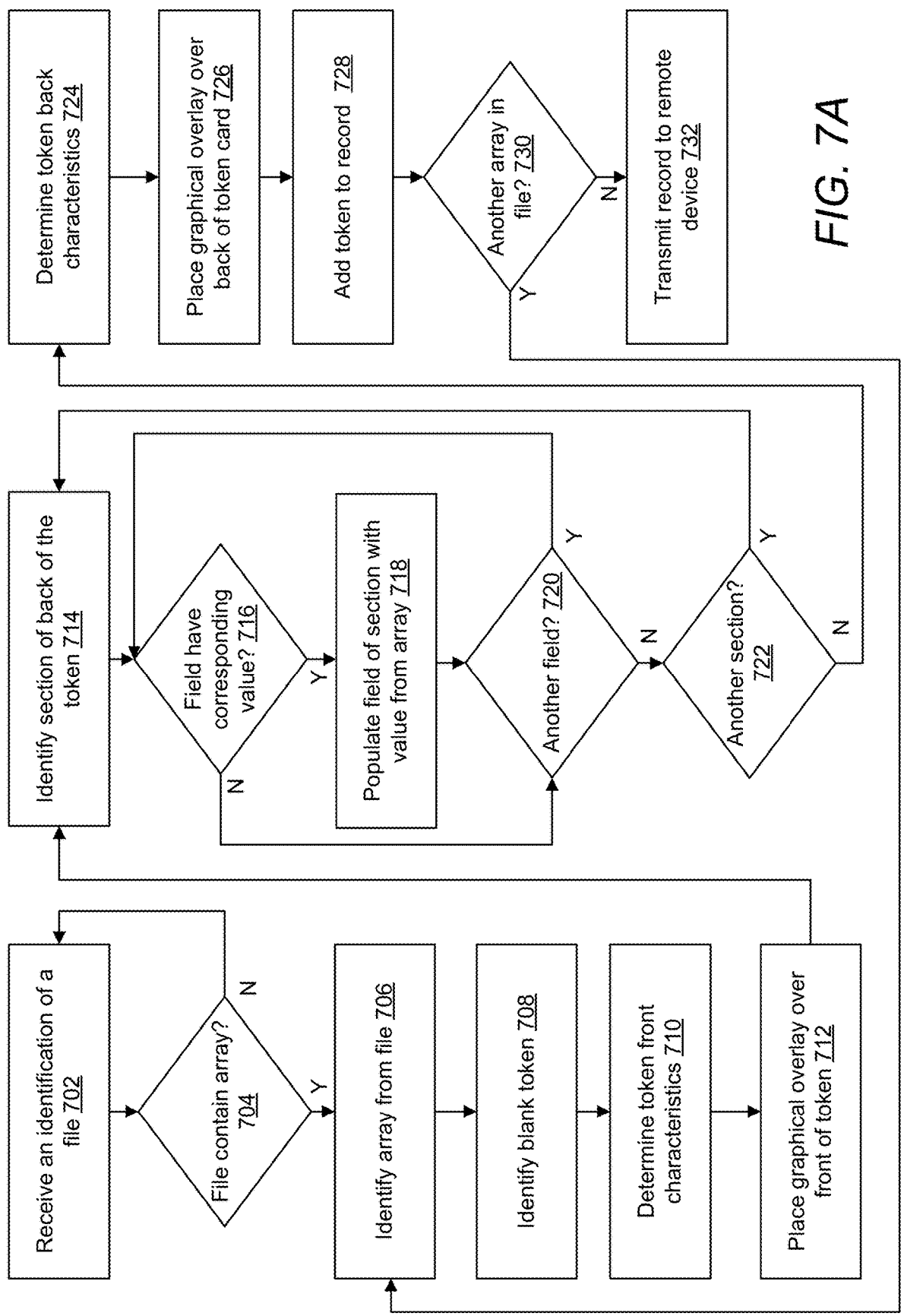

SYSTEMS AND METHODS FOR AUGMENTED REALITY ENVIRONMENTS AND TOKENS

CROSS-REFERENCE TO RELATED APPLICATIONS

The present application claims the benefit of and priority to U.S. Provisional Application No. 63/073,684, filed Sep. 2, 2020, and U.S. Provisional Application No. 63/145,317, filed Feb. 3, 2021, the entirety of each of which are incorporated by reference herein.

FIELD OF THE DISCLOSURE

This disclosure generally relates to systems and methods for augmented reality. In particular, this disclosure relates to systems and methods for multi-user interaction with augmented reality environments and tokens and maintaining a centralized or distributed ledger for such tokens.

BACKGROUND OF THE DISCLOSURE

Augmented reality systems overlay rendered images or video on a real-world scene, creating a mix of reality and virtual reality, hence "augmented" reality. However, the adoption of augmented reality systems by users has been slow due to the lack of compelling interactive content and "sole-user" experience that prevents groups of users from participating simultaneously.

SUMMARY OF THE DISCLOSURE

Implementations of the systems and methods discussed herein provide a multi-user augmented reality environment in which users can interact with physical components locally, while viewing similar interactions from remote users within an augmented reality environment, providing an improved and engaging user experience. The augmented reality environment may include different types of animations, in some cases animations involving individual characters interacting with each other upon some criteria being met. These animations may increase users' immersion into the environment. Advantageously, by virtualizing the interactive environment as opposed to simply presenting a video conference view, the system can provide virtual or animated effects to all users, can enforce policies or rules, can leverage the environment to determine which animations to present, and may provide security and authentication features, depending on the implementation.

To create the virtualized environment, a series of real-world "physical tokens" may be created that correspond to characters within the virtual environment. To quickly and accurately create such tokens, the system may pull data from arrays of the files for the individual tokens and create image files that can be mapped onto the physical tokens to be sold. Using this method to generate the tokens instead of manually typing in data for each of the tokens may substantially save time given that hundreds of thousands of the tokens may need to be created to successfully create the augmented reality environment. Further, by pulling data from arrays for each of the tokens instead of manually typing in the data, the system may reduce the number of errors (e.g., typographical errors) that may occur when creating the tokens. Avoiding such errors may help avoid creating unusable tokens within the environment because they may cause the tokens to be unreadable to an augmented reality application. Avoiding the errors may also help avoid inadvertently giving individual tokens too much or too little power when used for a game in instances in which data read from the tokens is used to determine game characteristics of the token's character within the game.

Furthermore, in some cases, it may be useful to store ownership records of the different tokens such that ownership of the tokens is verifiable and a user cannot create or counterfeit a token. One example of such a storage method may be a distributed ledger such as a blockchain, which may be a distributed ledger that is maintained and verified by multiple nodes or computing devices. Verifiable ownership may be particularly useful when tokens in a game represent different entities that have characteristics that may be overpowered if impermissibly changed or obtained. Thus, it may be useful to maintain an immutable chain of ownership on a ledger for individual tokens to avoid counterfeits.

One drawback to using distributed ledgers to maintain a chain of ownership is that such ledgers can often require a large amount of processing resources to maintain. Use of such processing resources may cause the computers that maintain the system to use a large amount of energy. For example, as users perform more and more transactions and trade gaming tokens (e.g., physical tokens) with each other, a blockchain may require more and more processing resources and energy to maintain. Given that blocks on the blockchain may contain animation video files for the different tokens, each transaction that includes information for the token may substantially increase the amount of memory and energy that is required to validate the transaction block for the transaction and maintain the blockchain.

Implementations of the systems and methods described herein may overcome the above-described technical deficiencies by avoiding placing the metadata for the tokens on the ledger. Instead, the system may store the metadata in a separate database that may store records for each token and correspond to the respective token's token identifier. The records on the ledger may only include information indicating ownership of the token was transferred to a different user account without any metadata for the token. Accordingly, while the number of records on the blockchain may remain substantially the same compared to previous systems, implementations of the system and methods described herein may enable the records to contain much less data, saving memory resources and the energy that is required to maintain the ledger.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

FIGS. 7A-7B are flow charts of an implementation of a method for automated visual code generation;

Figure 1A:
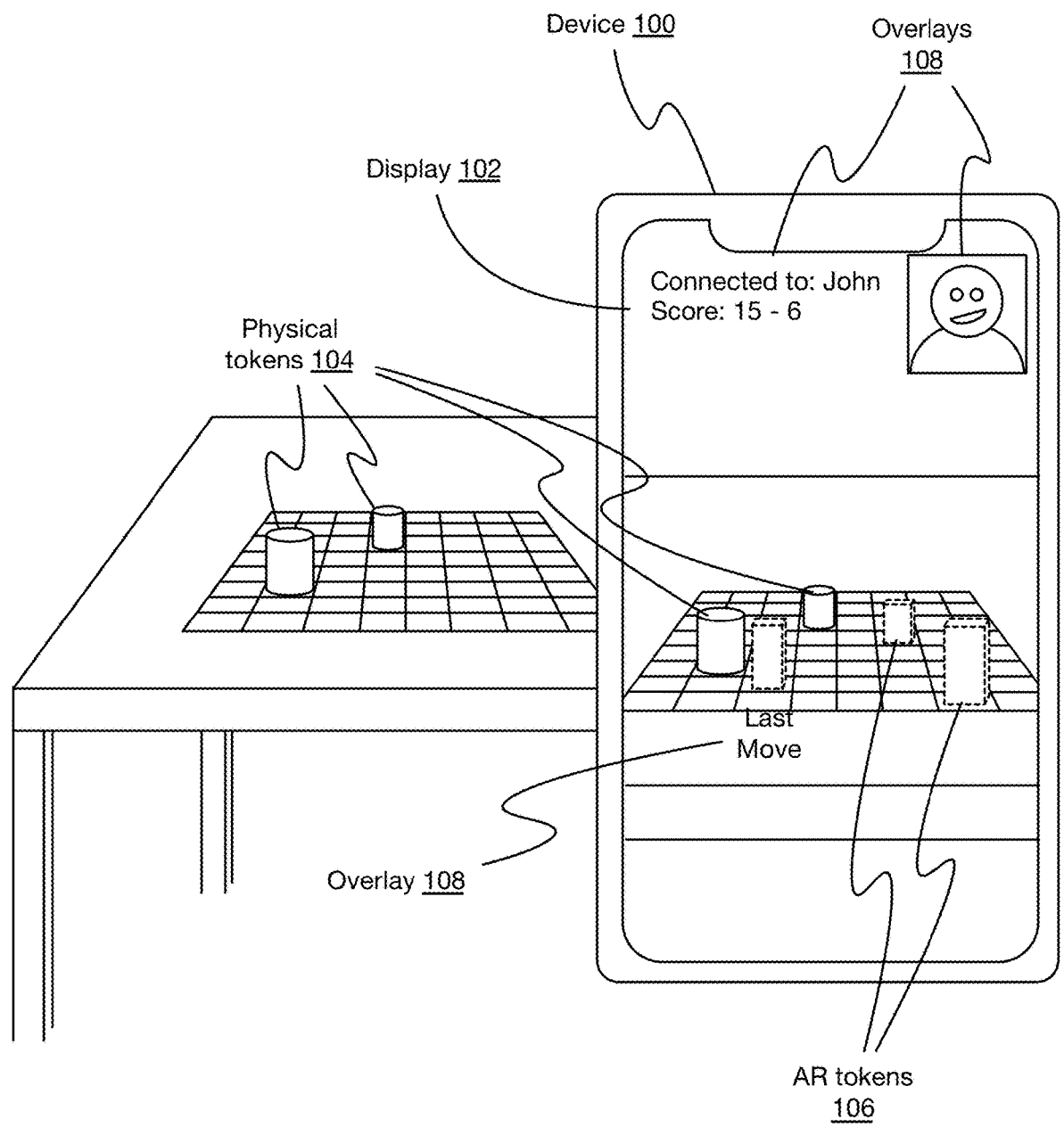
FIG. 1A is an illustration of an implementation of a multi-user augmented reality system.

The details of various embodiments of the methods and systems are set forth in the accompanying drawings and the description below.

DETAILED DESCRIPTION

For purposes of reading the description of the various embodiments below, the following descriptions of the sections of the specification and their respective contents may be helpful:

Section A describes embodiments of systems and methods for augmented reality environments;

Section B describes embodiments of systems and methods for automated visual code generation; and Section C describes a computing environment which may be useful for practicing embodiments described herein.

A. Systems and Methods for Augmented Reality Environments

Augmented reality systems overlay rendered images or video on a real-world scene, creating a mix of reality and virtual reality, hence "augmented" reality. However, adoption of augmented reality systems by users has been slow due to the lack of compelling interactive content and "sole-user" experience that prevents groups of users from participating simultaneously. In particular, games that include physical tokens, such as chess, backgammon, poker, or other games involving dice, cards, tokens, or other such tokens require physical proximity of players so that they can interact with the same tokens. While online analogs have been created that allow users to play remotely with each other in a virtualized game environment via a web browser or other application using a mouse or keyboard or touchscreen, such as an online poker game or chess game, these experiences lack the visceral and tactile feel of the components of a physical game. In short, clicking a "roll dice" button may be less satisfying than rolling physical dice.

Implementations of the systems and methods discussed herein provide a multi-user augmented reality environment in which users can interact with physical components locally, while viewing similar interactions from remote users within an augmented reality environment, providing an improved and engaging user experience. Advantageously, by virtualizing the interactive environment as opposed to simply presenting a video conference view, the system can provide virtual or animated effects to all users, can enforce policies or rules, can leverage the environment to determine which animations to present, and may provide security and authentication features, depending on the implementation.

Furthermore, in some cases, it may be useful to store ownership records of the different tokens such that ownership of the tokens is verifiable and a user cannot create or counterfeit a token. One example of such a storage method may be a blockchain, which may be a distributed ledger that is maintained and verified by multiple nodes or computing devices. Verifiable ownership may be particularly useful when tokens in a game represent different entities that have characteristics that may be overpowered if improperly changed or that have been improperly obtained. For instance, if a user counterfeits the five strongest characters in a game that are otherwise extremely rare and hard to obtain, the user may have an unfair advantage over other users that obtain characters for the game fairly (e.g., by purchasing packs or trading with others). Thus, it may be useful to store records of token ownership on an immutable ledger that indicates the transfer of ownership of the different tokens between individuals to create a chain of ownership that goes back to the original manufacturer.

One drawback to using distributed ledgers, such as blockchain, to maintain a chain of ownership is that such ledgers can often require a large amount of processing resources to maintain. Use of such processing resources may cause the computers that maintain the ledger to use a large amount of energy. For instance, each record that is generated within the ledger may cause the computers that maintain the ledger to process the data within the record each time the ledger and/or record is validated. Accordingly, as users perform more and more transactions and trade gaming tokens with each other or purchase packs from the manufacturer, the blockchain may require more and more processing power to maintain. An augmented reality game that uses tokens may involve hundreds of thousands of records that correspond to the different tokens. The number of records may continue to increase as the tokens get created, distributed, and traded. Given that the tokens may correspond to one or more animations, which may include large video files that may be stored in the various records, such increases may be compounded substantially over time.

Implementations of the systems and methods described herein may overcome the above-described technical deficiencies by avoiding placing the metadata for the tokens on the ledger. Instead, the system may store the metadata in a separate database that may have a record for each token that corresponds to the token's token identifier. The system may use the token identifier to map the metadata for the tokens to the transaction records on the ledger such that each record within the ledger may only have data indicating the transaction occurred. The records on the ledger may not include the metadata including information about the token such as the token's value, animations that correspond to the token, any events that occurred to the token, signatures for the token, etc., because that data may be stored in the separate database. Accordingly, while the number of records on the blockchain may remain substantially the same compared to previous systems, implementations of the system and methods described herein may enable the records on the ledger to contain much less data while still enabling each token to have its own metadata, saving memory resources and the energy that is required to maintain the ledger.

FIG. 1A is an illustration of an implementation of a multi-user augmented reality system. A device 100 of a user, which may comprise a smartphone, tablet computer, or other such portable computing device, may include a display 102 and a camera (not illustrated). The camera may capture an image of or video of a scene or environment. Physical tokens 104 may be placed within the environment by the user and recognized within the image or video by the computing device 100. The positions of the tokens 104 and identities of the tokens 104 may be determined (e.g. via object recognition, detection of QR codes or other visual codes including codes hidden in images via steganography, receipt of Bluetooth or Near Field Communication transmissions from the tokens, or other such methods), and the identifiers and positions within the environment may be transmitted to a computing device of a remote user (not illustrated). Similarly, the computing device 100 may receive identifiers and positions of physical tokens placed in a remote environment by the remote user. The computing device 100 may render virtual images within a display of the captured scene or environment (e.g. AR tokens 106) representing the physical tokens placed by the remote user. In some implementations, additional data may be displayed via one or more overlays 108 including connection information, a video from a front-facing camera of the device of the remote user, user information, scoring information, identifications of tokens including physical tokens 104 and/or virtual tokens 106, or other such information.

Figure 1B:
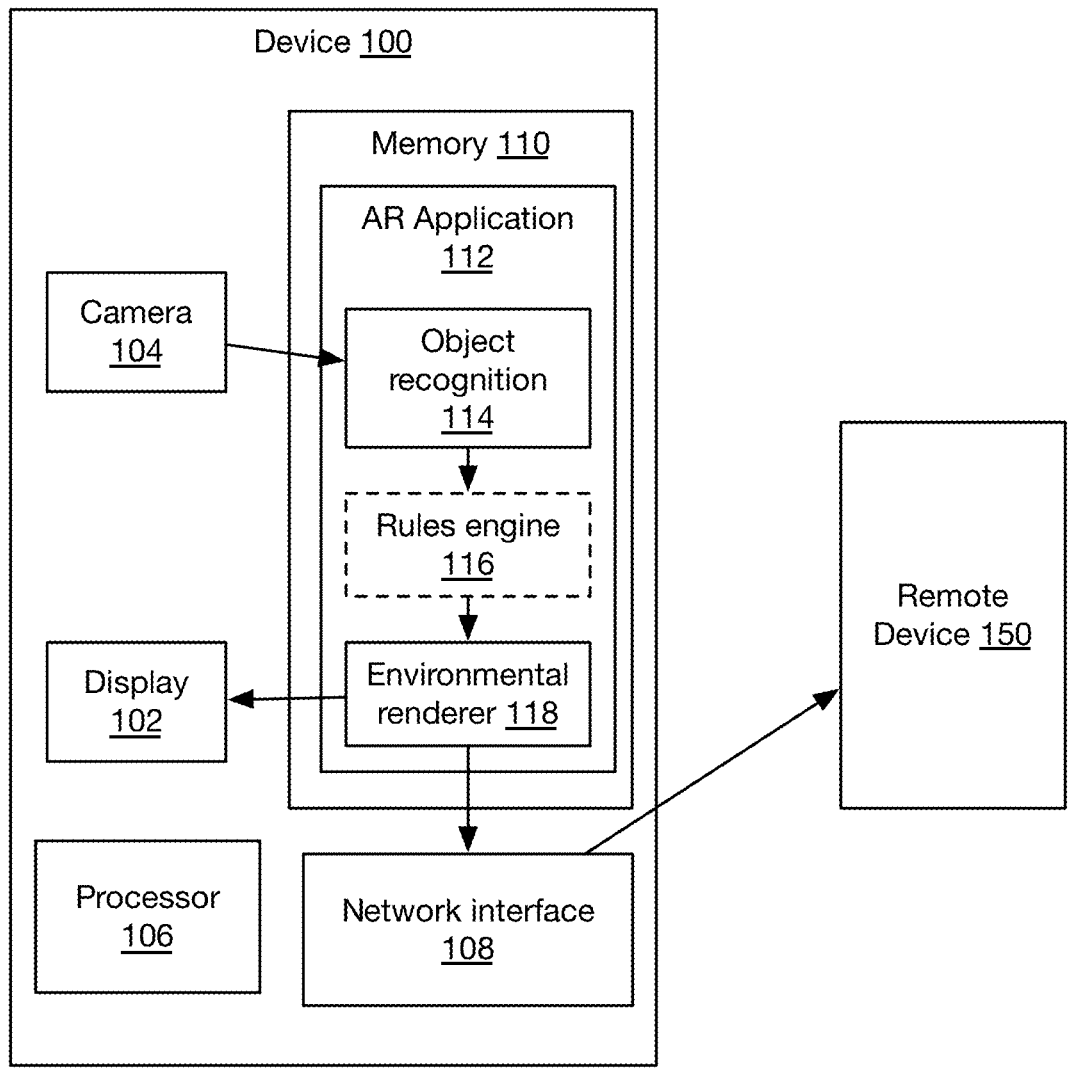
FIG. 1B is a block diagram of an implementation of a system for providing multi-user augmented reality.

FIG. 1B is a block diagram of an implementation of a system for providing multi-user augmented reality. As discussed above in connection with FIG. 1A, a first device 100, such as a smartphone, tablet computing device, laptop computing device, smart appliance (Internet-of-Things or IoT device), or other such device may communicate with a remote device 150 via a network to provide a shared augmented reality environment. Each device 100, 150 may comprise a display 102, which may include an LED display, OLED display, or other type of display (including a display incorporating an input device, such as a resistive or capacitive touchscreen).

Each device 100, 150 may also comprise a camera (or cameras) 104, which may include one or more rear-facing cameras, including stereoscopic cameras, depth cameras, time-of-flight cameras, or other such cameras for sensing distances to objects in a three-dimensional environment; cameras with variable focal lengths for measuring distance to objects; projectors and receivers such as infrared "point cloud" or grid projectors and corresponding infrared sensors; and/or black and white or color cameras.

Each device 100, 150 may further comprise one or more processors 106 (including co-processors such as graphics processing unit (GPUs) or tensor processing units (TPUs)), and/or may communicate with other devices providing co-processing power (e.g. cloud-based processing units such as virtual computing devices, desktop computing devices connected via a network, etc. for performing object recognition). Each device 100, 150 may also comprise one or more network interfaces 108, such as a wireless network interface (e.g. 802.11 or WiFi, cellular, or satellite network interface) and/or a wired network interface (e.g. Ethernet) for communicating with each other and/or with other computing devices via a network, such as a Wide Area Network (WAN) such as the Internet, Local Area Network (LAN), cellular network, broadband network, peer-to-peer network, or any other type and form of network. Although not illustrated, devices 100, 150 may communicate via one or more additional devices, such as gateways, switches, routers, firewalls, accelerators, load balancers, security appliances, or other such devices. Each device 100, 150 may further comprise one or more memory devices 110 (e.g. flash memory, hard drives, etc.) for storing applications such as an augmented reality (AR) application 112 as well as other applications (e.g. operating systems, media players, web browsers, social media applications, etc.).

AR application 112 may comprise an application, service, server, daemon, routine, or other executable logic for capturing an image or video from one or more cameras 104, detecting and identifying positions of objects within a real environment, and rendering a display of the captured image or video with one or more additional objects or data rendered at virtual positions within the environment (e.g. from a virtual camera viewpoint corresponding to a camera 104). AR application 112 may comprise or execute an object recognition algorithm for identifying objects within a captured image or images from camera 104. In many implementations, real objects placed within the view of a camera 104 may comprise optically detectable codes, such as barcodes, QR codes, microdot codes, or other such codes that may be detected and recognized by the object recognition algorithm. In some implementations, AR application 112 may be configured to identify specific images that are depicted on such objects and identify profiles that correspond to the identified images to determine which animations or images to display.

In some implementations, an object recognition system may utilize a priori knowledge to identify real objects within the view of a camera 104. For example, in some implementations, the real objects may comprise specified tokens or pieces having distinct shapes (e.g. chess pieces, miniature figures, etc.), cards with numbers or text or predetermined images, dice with visible numbers or pips, or other such objects. In some implementations, images of the objects from one or more angles may be stored in a database (or converted to a bitstream and encoded as a hash value) for comparison to images captured by the camera 104. In some implementations, a machine learning algorithm trained on images of the objects from multiple angles and distances may be utilized to recognize the objects within captured images from cameras 104. For example, a machine learning algorithm such as a convolutional neural network or other type of classifier may be trained to recognize a specified token or object in a large training data set. Because the objects may be pre-specified (e.g. tokens, pieces, cards, dice, etc.), the training data set may be pre-labeled to allow for supervised learning for high accuracy. The trained model may be provided to computing devices 100, 150 for local execution by a processor 106 or co-processor, which may allow for use without optical codes. In some implementations, similar methods may be used to identify images on the objects such as an image that is pasted or painted on an object.

In some implementations, object recognition algorithm 114 may identify positions of detected objects and/or images on such objects relative to each other, or in some implementations, relative to the camera. For example, in some implementations, objects may be placed in a real-world environment on a board or playing surface that may be visually recognizable (e.g. a chess board, map, etc.). The object recognition algorithm may identify the surface and the AR application 112 may place the surface within a three-dimensional environment (e.g. with a corner at an origin of a coordinate system). Physical objects on the surface may be detected and their positions within the virtual coordinate system determined relative to the placed surface (e.g., via occlusion of surface features of the surface; by determining a distance to the object based on a visual scale (with the object's actual size and the camera's optical properties being known by the AR application, or by comparing a known size of the object and the surface to the apparent size of the object and surface within the captured image to determine scaling ratios corresponding to distances to the camera). In other implementations, the object recognition algorithm may use depth cameras (e.g. time of flight cameras, stereoscopic cameras, infrared projectors and cameras, etc.) to measure a distance to the object to place the object within a three dimensional virtual environment relative to a virtual camera corresponding to the camera. Identifications of the detected objects and their positions within the three dimensional virtual environment may be provided via a network interface 108 to a remote device 150 for display. Similarly, identifications of detected objects at a remote location, and their positions within the three dimensional virtual environment may be received from remote device 150.

AR application 112 may comprise an environmental rendering engine 118, which may comprise an application, service, server, daemon, routine, or other executable logic for rendering images or other data of virtual objects within a virtual environment and mixing the rendered images or other data with images received from a camera 104 of the device (e.g. as an overlay or otherwise mixed). For example, the camera 104 may capture an image of a surface and one or more physical objects from a viewpoint corresponding to the camera. Environmental rendering engine 118 may determine a coordinate system of a virtual environment relative to the surface and add, to the captured image (e.g. as an overlay), an image of a virtual object at a specified position within the virtual environment, viewed from a viewpoint of the virtual environment corresponding to the position of the physical camera 104 of the device, such that the rendered image seamlessly blends with the captured image to show the physical surface and/or objects and virtual objects together. Environmental rendering engine 118 may also combine other data or images with the captured and blended image, such as video windows (e.g. a video received from a front-facing camera of remote device 150), icons, animations, text, numerical values, or other data for display via display 102.

In some implementations, AR application 112 may also comprise a rules engine 116 for applying one or more policies to detected objects and/or positions of the objects and controlling transmission of the identification of the objects or positions to a remote device or controlling display of additional information on display 102. For example, rules engine 116 may apply game rules, such as where objects can be legally moved during each turn or what effect different objects or moves have on gameplay, and may determine whether a move or placement of an object is valid. If so, the AR application 112 may transmit an identification of the object and/or valid position to the remote device for rendering within the augmented reality display; if not, the AR application 112 may generate a warning, instruction, or other notification for display by display 102 to a user of the device (e.g. indicating that a move is invalid). Accordingly, the rules engine 116 may be used to enforce gameplay rules within the context of the multi-user augmented reality environment. Different rules may be utilized depending on the game and may be stored in a database of the AR application.

Figure 2A:
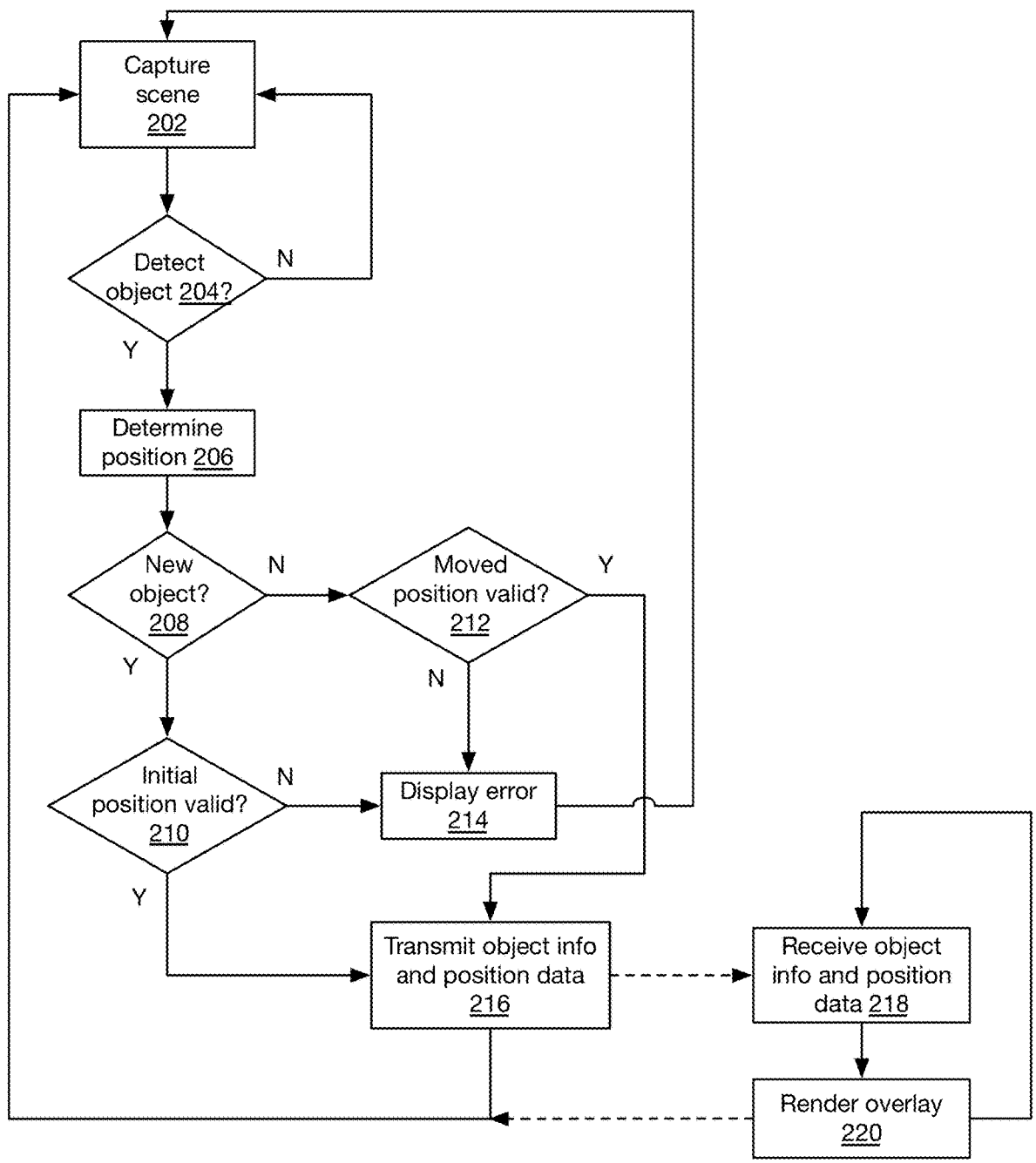
FIG. 2A is a flow chart of an implementation of a method for providing multi-user augmented reality.

FIG. 2A is a flow chart of an implementation of a method for providing multi-user augmented reality. At step 202, an image or video or pixel cloud of a scene (e.g., a real-time video feed) may be captured by an image capture device (e.g., a camera or multiple cameras) of a computing device. The scene may include one or more objects, such as tokens, cards, dice, or other objects. As described herein, such objects may be referred to as physical tokens. In some implementations, the scene may also include a board, surface, map, or other playing area.

At step 204, an AR application of the device may determine whether any objects are detected within the captured image. As discussed above, in many implementations this may be done by comparing portions of the image (with or without pre-processing, such as edge detection, noise filtering, etc.) with a library or database of images of objects (e.g. processed via a scale invariant feature transform, or with scaling and/or rotation, or via a trained machine learning model). If no object is detected, steps 202-204 may be repeated.

If an object is detected, then at step 206, a position of the object may be determined. The position may be determined by comparing a size of the captured image of the object to a known size and/or shape of the object, by comparing a captured position of the object to a reference object (e.g. a board or surface or map or other token), via position and distance within a pixel cloud, or other such means.

At step 208, in some implementations, the AR application may determine if the object is a new object (e.g. newly placed, as opposed to having been identified in a prior image). If the object is a new object, at step 210 in some implementations, the AR application may determine whether an initial position of the object complies with one or more rules or policies governing placement of the object within an environment (e.g. valid starting positions). If the position is invalid, then at step 214, an error or other notification may be generated and displayed on a display of the computing device, or an audible tone or message may be played for the user. Steps 202-214 may then be repeated. Similarly, if at step 208 the AR application determines that the object is not a new object, then at step 212 in some implementations, the AR application may determine whether a position of the object has changed from a prior position and if so, whether that change is valid according to the one or more rules or policies governing placement of the object within the environment. If not, then an error may be generated at step 214 as discussed above.

If the position is valid, then at step 216, an identification of the object and its position data may be transmitted to a remote computing device. Steps 202-216 may be repeated periodically (e.g. every frame, every second, every five seconds, etc.).

At step 218, the computing device may receive an identification of a physical object and its position data within the environment from the remote computing device (or the remote computing device may receive the identification from the computing device). At step 220, the computing device may render a virtual object within the environment from a viewpoint corresponding to the viewpoint of the physical camera of the computing device, and may mix with or overlay the rendered virtual object on a captured image or video from a camera of the computing device and display the blended augmented reality image on a display of the device.

In some implementations, selection of animations, images, or video associated with a physical object or token for playback may be modified by other physical objects' proximity within the playing field or view of the camera. For example, in some implementations, if a first token is present in the view of a camera, a first animation or image may be displayed or rendered within the augmented reality environment; however if a second token is present in the view of the camera, the second token associated with the first token (e.g., profiles stored in the AR application for the two tokens may store a value identifying the other token), then a second animation or image may be displayed or rendered instead of the first animation or image. This allows for the augmented reality environment to represent "sets" of associated tokens with different animations or images or virtual objects. In some implementations, as many tokens may be associated in this manner as desired, with different animations played for each combination of tokens present.

In some implementations, physical objects or tokens may be identified with a unique identifier code, which may be a visible code such as a number or alphanumeric string, barcode, QR code, or any other such type of visible code; or may be a non-visible code or not easily perceivable by humans, such as a watermark or steganographic code within an image (e.g. microdot code), an identifier encoded in IR reflective material within an otherwise visible image, etc. In addition to providing a code that can be recognized by a computing device in order to render a corresponding virtual object within a virtual environment, by having a unique code, the token or object may be uniquely associated with a user and/or may be traded between users, may be securely authenticated to reduce counterfeiting, etc. For example, each token may be encoded with a unique identifier with such identifiers recorded in a ledger (e.g. a centralized or distributed ledger, such as a blockchain ledger or other immutable ledger, a mutable ledger or database, or any other type of data record). In some implementations, the ledger may store the unique identifier in association with a user identifier, and/or chain of user identifiers indicating a chain of transactions or trades of the associated token. With an immutable ledger, for example, this may provide a secure record of possession of a token and prevent counterfeiting and duplication.

Figure 2B:
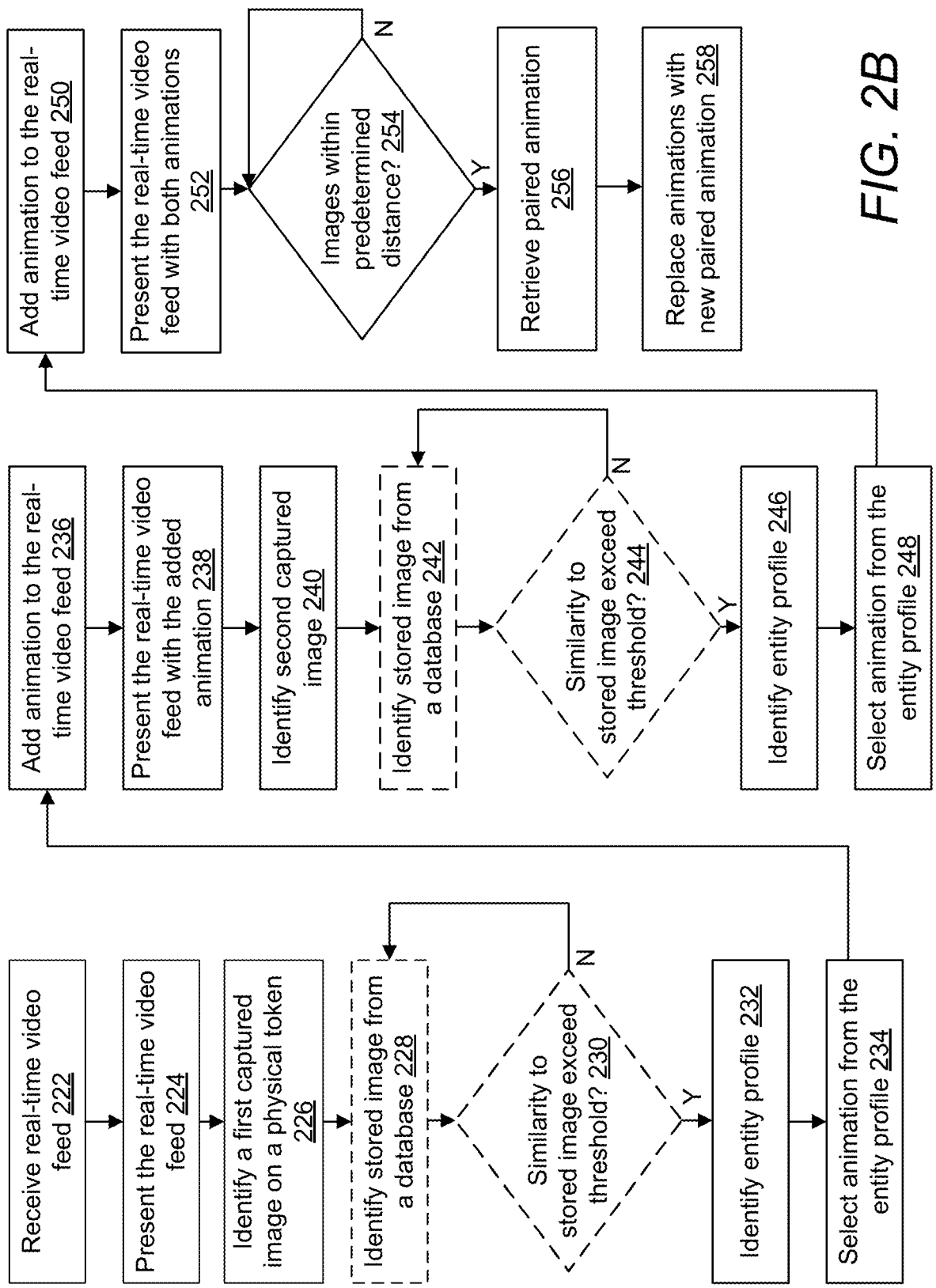
FIG. 2B is another flow chart of an implementation of a method for providing multi-user augmented reality.

FIG. 2B is a flow chart of another implementation of a method for providing multi-user augmented reality. At step 222, an AR application executed by a computing device may receive a real-time video feed from an image capture device. The image capture device may be stored within the computing device or may be external to the computing device. The real-time video feed may include one or more images depicting a current viewpoint of the image capture device. The real-time video feed may include images of a scene including various objects such as physical tokens or a playing area of a game, as described herein. At step 224, the AR application may present the real-time video feed on a display of the computing device. For instance, the AR application may receive the real-time video feed and present the real-time video feed on the display such that a user can have a real-time view of the scene.

At step 226, the AR application can identify a first captured image from the real-time video feed. The first captured image may be an image (e.g., an image of an entity such as a basketball player or another character within a game) on a physical token depicted within the real-time video feed. In some implementations, the AR application can identify the first captured image from the real-time video feed by first identifying the physical token (e.g., identifying the token via edge detection or other object recognition technique), identifying the surface area of a surface of the token, and identifying the pixels that depict the surface of the token.

In some implementations, the AR application may identify the image by using object character recognition techniques on the frames within the real-time video feed. For example, at step 228, the AR application may identify a stored image from a database (e.g., a relational database). The database may be stored within the AR application or at another location physically separate from the AR application in memory of the computing device. The stored image may be an image of a character within the gaming environment that has a corresponding profile (e.g., a character or player profile). Such a profile may be stored within the database or at another location within the AR application or the memory of the computing device.

At step 230, the AR application may compare objects (including the image on the physical token) within individual frames of the real-time video feed to the stored image as the AR application receives and processes the frames. In some implementations, the AR application may compare the image on the physical token to the stored image and determine a similarity score for the image on the physical token based on the number of pixels of the captured image that map (e.g., have matching characteristics) to pixels of the stored image. If the AR application determines the similarity score for the captured image and the stored image does not exceed a similarity threshold, the AR application may identify another stored image from the database at step 228 and repeat the process of steps 228 and 230. The AR application may repeat these two steps until the AR application determines a similarity score for the captured image with a stored image that exceeds the similarity threshold. If the AR application determines there is not a stored image with which the captured image exceeds the similarity threshold, the AR application may generate and present an alert indicating no match could be found to a user and/or stop comparing the captured image to stored images within the database to conserve resources.

If the AR application determines the captured image has a similarity score with a stored image that exceeds the similarity threshold, at step 232, the AR application may identify the respective stored image and an entity profile that corresponds to the stored image. The entity profile may be a data structure stored in memory and include attribute-value pairs (e.g., fields and values for different attributes) for an entity (e.g., a character in a game such as a basketball player). The attribute-value pairs may include values for different characteristics about the entity and/or animations (e.g., set patterns of movement for the entity within a two or three-dimensional space) for the entity. Each entity profile may correspond to a stored image that matches an image that is depicted on a physical token. The AR application may identify the stored image that matches the captured image on the physical token and identify the entity profile that corresponds to the matching stored image (e.g., identify the entity profile based on a stored association between the stored image and the entity profile).

At step 234, the AR application may select the animation from the identified entity profile. For example, after identifying the entity profile that corresponds to the matching stored image, the AR application may identify the animation attribute-value pair of the entity profile. The animation attribute-value pair may include a pointer to an animation illustrating the entity of the profile moving according to a set pattern or the video file for the animation itself. If the animation attribute-value pair includes a pointer to an animation, the AR application may select the pointer to retrieve the animation either from memory in the computing device or from a remote device (e.g., a remote server such as a cloud server).

At step 236, the AR application may add the animation to the real-time video feed. The AR application may add the animation to the real-time video feed as an overlay above the captured image or the physical token that caused the animation to be selected. For example, the AR application may identify the position of the physical token within the real-time video feed and identify an animation position that is a distance (e.g., a predetermined distance) above the physical token (e.g., a predetermined number of pixels above the position of the physical token). The AR application may then overlay the animation at the animation position such that the animation will appear on a display instead of the imagery captured by the image capture device when the real-time video feed is being displayed.

In some implementations, the AR application may add the animation to the real-time video feed by adding the animation to a location within a three-dimensional virtual environment. For example, the AR application may generate a three-dimensional virtual environment by setting a base position of the computing device and the image capture device, which may be within the housing of the computing device. From the base position, the AR application may use one or more accelerometers and/or gyroscopes to measure distances that the image capturing device moves with respect to a fixed point in space (e.g., a user manipulating the image capture device). The AR application may identify the image on the physical token as described above and subsequently identify the location of the image (or the physical token itself) from the real-time video feed. The AR application may insert or mark the location of the image and continuously determine the location of the image on the physical token or the physical token within the virtual environment as the image capture device changes its viewpoint. The AR application may place or add the animation a predetermined position above (e.g., the positive y-direction) the insertion for the image or token such that the AR application may add the animation to the real-time video feed based on the position of the insertion rather than by continuously identifying the animation from the image. Thus, the AR application may add the animation to the real-time video feed after only viewing the image once and continue to present the animation when the image on the physical token is no longer in view of the image capture device. At step 238, the AR application may present the real-time video feed with the added animation on a display of the computing device.

At step 240, the AR application may identify a second captured image. The AR application may identify the second captured image on another physical token from the same real-time video feed as the first captured image. In some instances, the AR application may identify the second captured image in the same frames of the real-time video feed as the first captured image. The AR application may select and add an animation to the real-time video feed for the second captured image at steps 240-250 in the same manner that the AR application added the animation for the first captured image to the real-time video feed in steps 226-238 (e.g., identify an entity profile for the second captured image and an animation from the profile and add the animation to the real-time video feed at a location above the second captured image and/or physical token). If both physical tokens are within the field of view of the image capture device as the image capture device transmits the real-time video feed to the AR application, the AR application may add the animations to the real-time video feed such that they both appear in the same frames. Accordingly, at step 252, the AR application may concurrently present both animations to a user on a display.

At step 254, the AR application may determine whether the two captured images or the physical tokens are within a predetermined distance of each other. The AR application may do so by comparing the number of pixels between the images or the physical tokens to a threshold or by comparing the distance between the positions of the images or physical tokens (e.g., the positions of the indications or marks of the images or physical tokens) within a three-dimensional environment to a threshold. The AR application may continuously (e.g., at periodic intervals) make this comparison when the two tokens are concurrently within the real-time video feed.

If the AR application determines the tokens or images are within the threshold distance of each other, at step 256, the AR application may retrieve a paired animation. A paired animation may be an animation in which the entities depicted within two or more separate animations interact with each other (e.g., two basketball players high five, hug, pretend to guard each other, defend one another, wave at each other, etc.). Pointers to such paired animations may be stored within the entity profiles of the images or physical tokens. For example, upon determining the two images or physical tokens are within a predetermined distance of each other, the AR application may identify paired animation field-value pairs from the two entity profiles that contain pointers to paired animations for the two entities. In some implementations, the AR application may retrieve the paired animation in response to determining the two tokens are concurrently within the real-time video feed without regard to any distance threshold. The AR application may retrieve a paired animation for each physical token or image using the pointers and add the paired animations to the real-time video feed such that the paired animations may be displayed. Accordingly, the AR application can create a more immersive augmented reality environment in which the characters interact with each other instead of simply being individual units that do not acknowledge each other.

In some implementations, the paired animation may include depictions of the characters for both physical tokens or images such that only one paired animation needs to be retrieved. For example, upon determining both tokens are within a predetermined distance of each other, the AR application may only retrieve a single paired animation from one of the entity profiles of the two images or physical tokens. The AR application may then replace both animations that are overlaid over the real-time video feed with the single paired animation to depict the two entities within the paired animation interacting with each other. By only including paired animations for one of the images or tokens instead of both of the images or tokens, a significant amount of memory may be saved given that each animation may have a large file size and there may be thousands of entities for which paired animations may be stored.

In some implementations, the AR application may select a new paired animation in response to determining two images or physical tokens are above a threshold distance from each other. In one example, a paired animation may depict an entity that corresponds to one image or token running towards an entity that corresponds to the other token of the paired animation. For instance, if the AR application determines a first token is too far away from a second token, the AR application may retrieve an animation from an entity profile of one of the tokens that depicts a basketball player running off of his or her respective token towards a basketball player of the other token.

In some implementations, to depict a basketball player running off of a token, the animation may include coordinates that indicate that the basketball player will "step down" a predetermined distance (e.g., the height of the respective token) in the negative y-direction and run towards the other player. In some implementations, the AR application may determine the height of the token from the live-video feed as an offset on the "floor" of a three dimension virtual environment and adjust the animation such that the player steps down the determined height in the animation, allowing for the same animation file to be used for different sized tokens without breaking the realism of the augmented reality environment with a player running across thin air. In such implementations, the AR application may identify the position of one of the tokens and execute an application causing the animation to depict a character running towards the position.

In some implementations, the paired animations may only correspond to combinations of specific players. For instance, the AR application may only retrieve a paired animation for player A when the token or image of player A is depicted within the same frame or is within a predetermined threshold of the token or image of player B. The AR application may not retrieve a paired image if a similar criteria is met between player A and player C. To do so, the AR application may identify identifiers of the two profiles of concurrently displayed images or physical tokens and only select the paired animations if the players satisfy a matching policy identifying the other image or physical token within one of the profiles.

In some implementations, to conserve resources and avoid latency in what may be a fast paced augmented reality environment, the AR application may store animations for physical tokens that a particular user profile owns in a cache for quick access. The user account may be an account of the user that is using the computing device or an account of an individual with which the user expects to play a game in the augmented reality environment (e.g., a potential competitor). If the user account is owned the user of the computing device, the AR application may identify the physical tokens that are owned by the user account and any physical token purchases by the user account as the user account makes the purchases, identify the animations from memory of the computing device, and store the animations in the cache such that they may be quickly retrieved during gameplay. If the user account is owned by a potential competitor, the user may input an account identifier of the competitor and the AR application may retrieve information about the physical tokens the competitor owns (e.g., from a remote database) and add the animations to the cache of the computing device upon retrieval.

In some implementations, upon adding the animations for a user account to the cache, the AR application may update the profiles that correspond to the animations such that the pointers to the animations point to the animations location in the cache instead of their previous location. Accordingly, the AR application may perform the process described with respect to FIG. 2B without making any changes other than retrieving the animation for a physical token from a different location. Similarly, the AR application may perform the pre-retrieval upon determining one of the user accounts has two tokens with a paired animation. The AR application may identify the tokens with paired animations from the user accounts and retrieve the paired animations of the two tokens from the user accounts to store in the cache for quick retrieval.

In some implementations, information identifying the ownership of individual tokens is stored on a distributed or centralized ledger, such as a blockchain. In such implementations, to determine which physical tokens a user account owns, the AR application may search the ledger using the account identifier of the user account as an index and identify token identifiers of the tokens that the ledger indicates the account owns. The AR application may use the token identifiers as a key to retrieve the animations of the tokens from memory of the computing device or from a remote device, such as from an external database. The AR application may then store the animations in the cache of the computing device for quick retrieval.

As described herein, it should be noted each of the steps of FIGS. 2A and 2B may be performed by the computing device hosting the AR application or by a remote device to which the AR application transmits the data of any of the steps. Accordingly, if a computing device does not have the memory requirements necessary to store all of the necessary data for one or more of the steps, the computing device may allocate a portion of such steps to the remote device, which may have substantially more memory, in some implementations.

Figure 3:
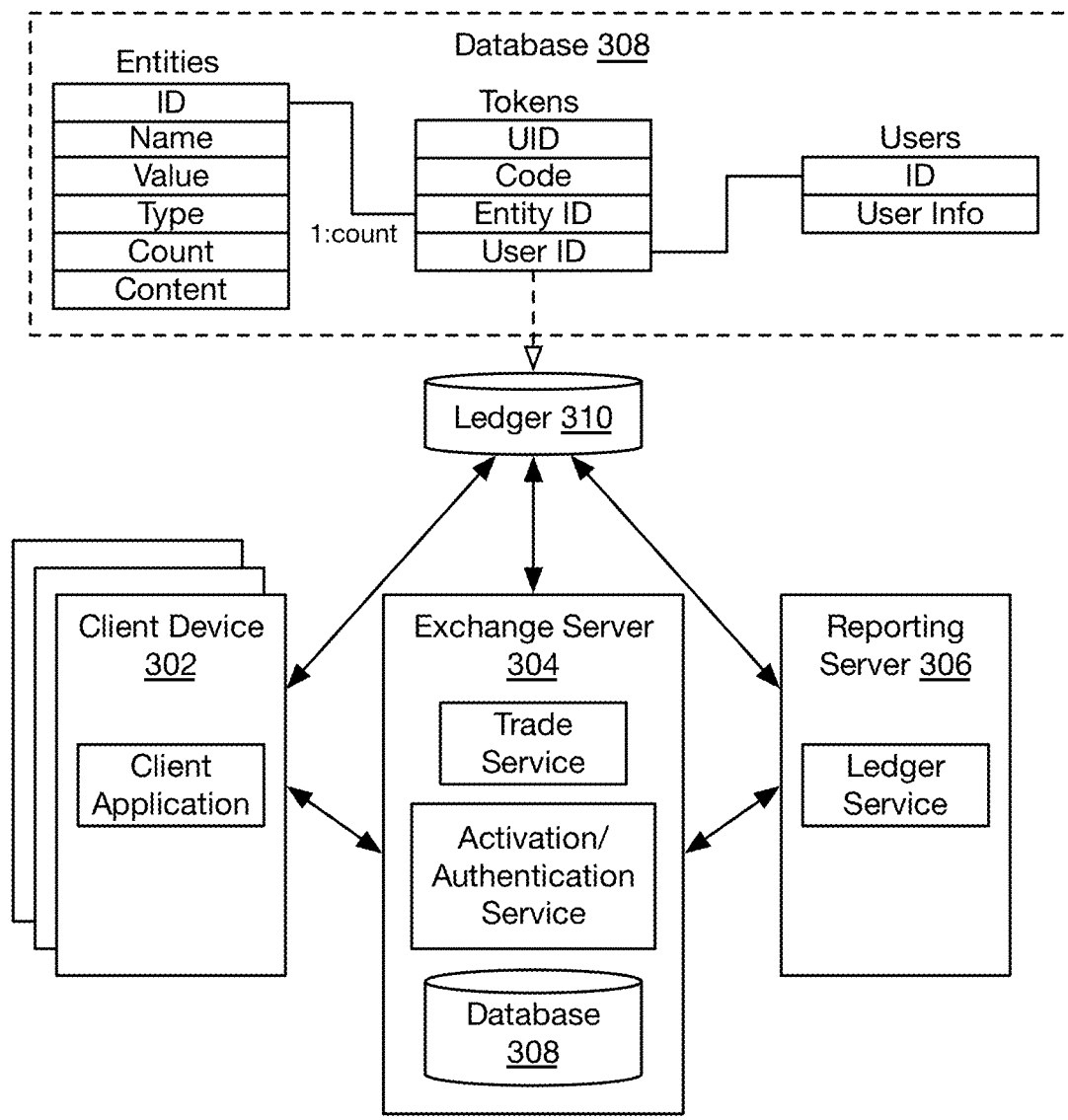
FIG. 3 is a block diagram of an implementation of a system for providing multi-user augmented reality.

FIG. 3A is a block diagram of an implementation of a system for providing multi-user augmented reality. Client device(s) 302 (which may comprise a device 100, 150) executing client applications (e.g. AR application 112) may communicate with each other and, in some implementations, with an exchange server 304. Exchange server 304 may comprise a computing device or cluster or farm of computing devices or a cloud of virtual computing devices executed by one or more physical devices for managing trading and/or authentication of physical tokens and recording trades and/ or activation of tokens in a database 308. Exchange server 304 may comprise one or more processors, memory devices, and network interfaces (not illustrated), and may execute one or more servers or services (e.g. remote procedure call or RESTful services or microservices, sometimes referred to as Software as a Service or SaaS services) for trading and token activation or authentication.

Physical tokens may be or include any object or objects in a real environment. For example, a physical token may be a card, dice, a pen, a piece of clothing, a shoe or pair of shoes, a book, a picture, a video game system, artwork, a car, or any other real-world object. Visual codes may be placed on such physical tokens as described herein so that a user can read or scan (e.g., via a client application) the token's code or an image on the token and view information about or otherwise activate the token. For example, in a shopping center, visual codes may be placed on items that are up for purchase. A user may scan the visual codes on the items using an augmented reality device to view various information about the items (e.g., manufacturer, brand, value, reviews, dimensions, etc.). In some implementations, images may be placed on the tokens that may be read by an AR application.

Physical tokens or objects may be "activated" by recording a token-specific identifier or code or creating a new database entry for the token-specific identifier or code. This may be done at time of manufacture of the token (e.g. by the manufacturer or system provider) or may be done at time of first use by a user (e.g. via a client application). In some implementations in which activation is performed by a user, the token identifier may also be associated with a user identifier in the database, the user identifier associated with the activating user. User identifiers may comprise any type and form of code, such as an alphanumeric string, hash identifier, index, username, or any other such identifier. In other implementations in which activation is performed by a manufacturer, a token may initially not be associated with a user identifier; an association with the user identifier may be recorded to the database subsequently, upon receipt of a request to register or authenticate a token by a client device 302 associated with the user. Such requests may comprise an identifier read or scanned from the token (e.g. a physical code printed, engraved, or embedded on the token or encoded in a machine readable format, such as a barcode or QR code), and a user identifier or client identifier. Similarly, tokens may be traded between users by providing a request comprising an identifier of the token and a new user identifier or client identifier to be associated with the token. In some implementations, the request may be authenticated and/or may comprise an identifier of a user or client presently associated with the token. Requests to transfer or trade tokens may be secured via any appropriate means, such as authenticated via a cryptographic signature associated with the user or client, provided after the client device logs in or otherwise authenticates with the exchange server 304, etc.

Database 308 may, in some implementations, comprise a relational database or other data structure for storing data about physical tokens and/or users. In some implementations, each token may be associated with one of a plurality of entities, which may represent different virtual objects. Each entity may be associated with a unique or semi-unique identifier; a name; one or more values including point values or scores; an object type from a plurality of predetermined types (e.g. individual entities, entity modifiers, environmental modifiers, etc.); a count of a number of tokens associated with that entity; and additional metadata (e.g. images, descriptive text, sounds, animations or videos, etc.). When physical tokens are manufactured and/or activated, each token may be associated with an entity (in a many tokens to one entity relationship). For example, an entity record for a given virtual object may have a count of 10,000, indicating that 10,000 physical tokens are associated with the entity.

Each token may be identified with a record in database 308 comprising a unique identifier or UID of the token and, in some implementations, a code such as a visual code, barcode, QR code, alphanumeric code, or other encoding of the UID for machine-readability or scanning or entry by a user; and an associated entity record identifier. In some implementations, once activated or associated with a user, the token record may also be associated with a user identifier. In some implementations, a single user identifier may be recorded; while in other implementations, a series of user identifiers may be stored, representing each successive possessor or owner of a token, with new user identifiers added in response to a trade request.

Database 308 may also comprise user records, which may include a user or client identifier and, in some implementations, information about a user or client (e.g. device type, address information, capabilities, or any other type and form of information). In some implementations in which personal information is stored, users may have the ability to configure and control which and/or whether information is stored to protect privacy. As discussed above, user or client identifiers may be associated with each token record (e.g. indicating a current possessor or owner of a token), and in some implementations, token records may comprise a plurality of user identifiers (e.g. an ordered list of subsequent owners or possessors). For example, a token first possessed by user #01, then traded to user #02, then subsequently traded to user #03 may be associated with a record including a string of user identifiers 01;02;03. Such identifiers may be concatenated with or without delimiters, stored in separate fields in an array, or any other type and form of storage.

In another similar implementation, tokens and/or user identifiers may be associated with addresses in a centralized or distributed ledger managed by a reporting server 306, and transactions recorded against the address indicating an exchange or trade. For example, in one such implementation, a blockchain ledger may be created with token identifiers as addresses. When a token (e.g. with identifier A1) is first possessed by a first user (e.g. user B1), a record may be recorded to an address A1 identifying B1. Subsequently, if the token is transferred to a second user (e.g. user B2), a second record may be recorded to address A1 identifying the transfer from B1 to B2. Each new record may be recorded within a new block of a blockchain to provide an immutable but easily searchable record. In some implementations, the above system may be reversed, with user identifiers used as addresses, and token identifiers recorded to addresses corresponding to a possessing user (e.g. with token A1 recorded first to address B1, then subsequently from address B1 to address B2, using the exchange example discussed above). Each implementation may have particular advantages for searching for either specific user records or specific token records. In a further implementation, these systems can be combined, with addresses for both tokens and users, and with user identifiers recorded to token addresses and token identifiers recorded to user addresses. While this may increase the number of records required (and the corresponding bandwidth and storage requirements), such a system may be easily indexed or searched by both token and user records, each of which may be useful at different times (e.g. searching for a list of transactions associated with a particular token to authenticate the token or ensure that it is not counterfeit; or searching for all token transactions associated with a particular user to identify all tokens owned or possessed by the user, regardless of when acquired).

In some implementations, the addresses of the records in the blockchain of a token may be created from the information on the token itself (in addition to or instead of the user identifiers or token identifiers as discussed above). For example, upon a token being manufactured and a record being created indicating the token was manufactured (e.g., a record containing data about the token such as visual data that is displayed on the token), the exchange server 308 may extract the values on the front and/or back face of the token (e.g., player identification number, player name, level, player abilities, etc.) and generate a block instance to append to the blockchain based on the extracted values (e.g., by creating a hash value of the extracted values and of the address of the last block on the blockchain). In another example, the exchange server 308 may concatenate the extracted values of the token with a token identifier of the token and/or a user identifier of the user that owns the token and use a hashing function on the concatenated value to generate the address, thus creating records that are easily searchable and that enable a user to search for lists of transactions to identify any counterfeits or to search for a list of tokens owned or possessed by a user over time while maintaining records of the information that is included on the tokens. By generating records in this manner, the exchange server 308 may ensure the data on the tokens may not be manipulated by individual users because any changes would be identifiable from breaks in the token's blockchain.

In some implementations, the aforementioned distributed ledger system for managing token ownership may be used to certify ownership of tokens as the tokens are traded. For example, in one such implementation, a first user A may purchase a token and register his ownership on a blockchain that maintains records of ownership for that token (e.g., generate a block instance that contains an identifier of user A as the owner). The first user A may then trade the token to a second user B who may update the blockchain for the token with a new block instance to indicate that the second user B is now the owner of the token. The users may continue to trade the token to further users and create new block instances for each change in ownership. Consequently, when a user (e.g., user E) is considering obtaining the token from another user (e.g., user D), user E may look at the blockchain records for the token and make sure there is a continuous chain back to the manufacturer (e.g., a chain without any breaks or changes in the tokens data between block instances). If user E determines there is a continuous chain of ownership for the token and that the token has not manipulated in any manner, user E may determine the token is not counterfeit and may be properly used in a virtual reality environment (e.g., the code for the token may be properly read by an augmented reality device and any data on the token is accurate).

In some implementations, the exchange server 304 may analyze the blockchain records of individual tokens to verify the tokens are not counterfeits. If the exchange server 304 determines there are any breaks in the blockchain (e.g., a buyer purchases the token from a user that was not recorded as having bought the token) the exchange server may determine the token is a counterfeit or has otherwise been tampered with. A break in the blockchain may indicate a counterfeit, for example, if a user changed the values on the tokens and potentially gave the token holder an unfair advantage for an augmented reality game or if an unauthorized user created the token. In some implementations, exchange server 304 may similarly analyze the chain of ownership for a token based on the user identifiers on the block instances and determine if there are any irregularities in the chain. If the exchange server 304 identifies any irregularities in the user identifiers or otherwise determines a token is a counterfeit, the exchange server 304 may "deactivate" the token so the counterfeit token may not be read or activated anymore. Because the ledger system is immutable, any unidentified changes in ownership or changes in the data of individual block instances may be immediately apparent as the change would cause a break in the blockchain. Thus, a self-monitoring system may be created using a blockchain ledger that can automatically stop counterfeiters from creating or manipulating tokens.

As discussed above, in some implementations, sets of tokens may be associated with each other. For example, entities within database 308 may be associated with other entities, along with associated metadata (e.g. images, animations, video, etc.) for each combination of entities. Additionally, in some implementations, a separate record may be stored in the database 308 and associated with the set (referred to in some implementations as a set record, an entity set, or by similar names). In some implementations, the entity set record may be stored within the centralized or distributed ledger or blockchain, and a user identifier may be added to the record responsive to the user identifier being associated with each token of the set. For example, given a token set with five tokens, if a single user ID is associated with all five tokens (e.g. by a user obtaining ownership of all five tokens at the same time, for example), then the user ID may be added to the entity set record, indicating common ownership of the set. This may be useful for confirming authenticity or ownership of tokens within sets and may be faster than retrieving individual records for the entities of the set, particularly for very large sets, by allowing a computing device to just retrieve the set record.

As discussed above, physical tokens may be utilized with features to enable augmented reality and tracking of the tokens. Such tokens may be utilized in various industries, including tokens associated with production and manufacturing materials; tokens associated with crops or livestock; etc. For example, each pallet of products in a warehouse may be associated with a physical token which may be viewed through an augmented reality application to retrieve and display additional data about the products (e.g. manufacture or expiration dates or locations, storage requirements, dimensions or weights, shipping destinations, etc.) for display. As the pallet is moved from a warehouse to a distributor to a retail terminal, the ledger record associated with the token may be updated with new location or company information.

Figure 4A:
FIGS. 4A-4G are illustrations of example implementations of physical tokens for use with a multi-user augmented reality system.
Figure 4B:
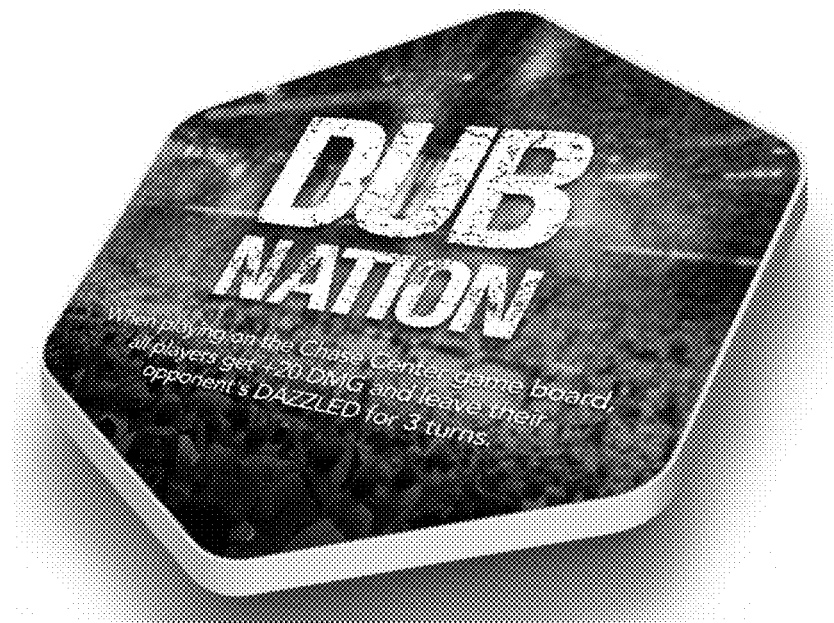
Figure 4C:
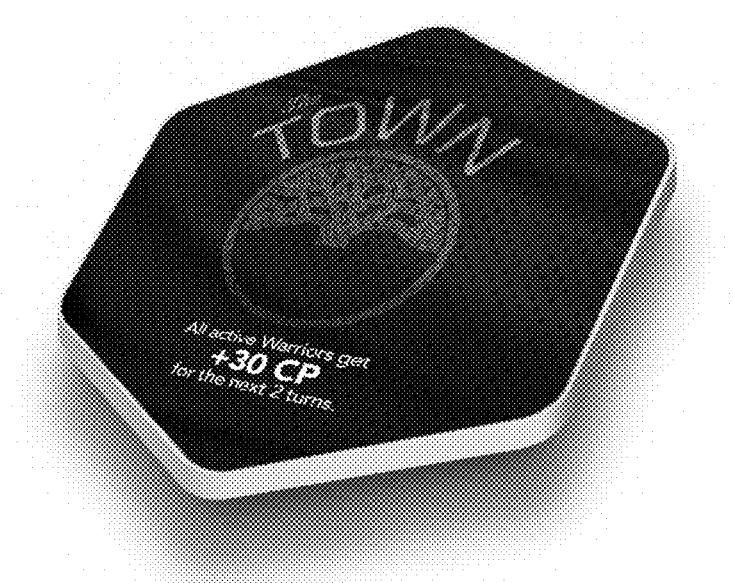
Figure 4D:
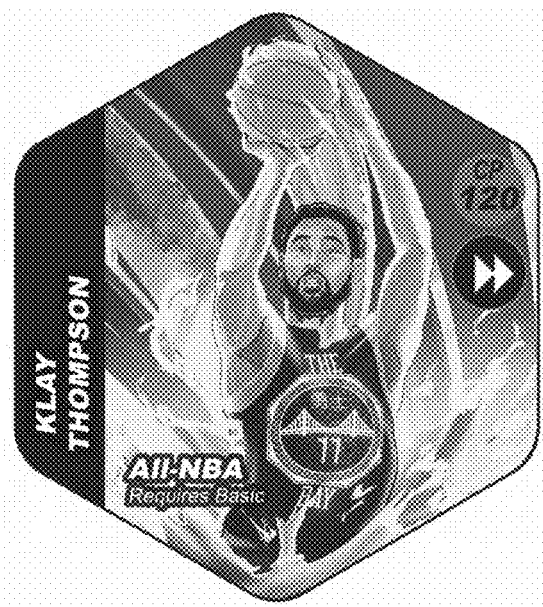
Figure 4E:
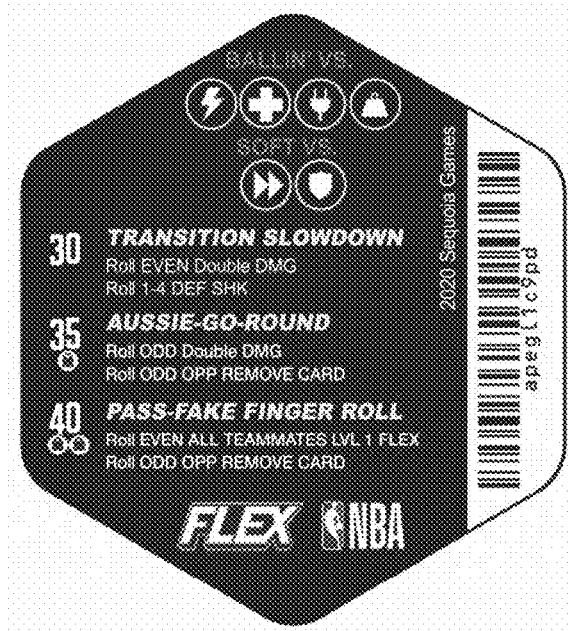
Figure 4F:
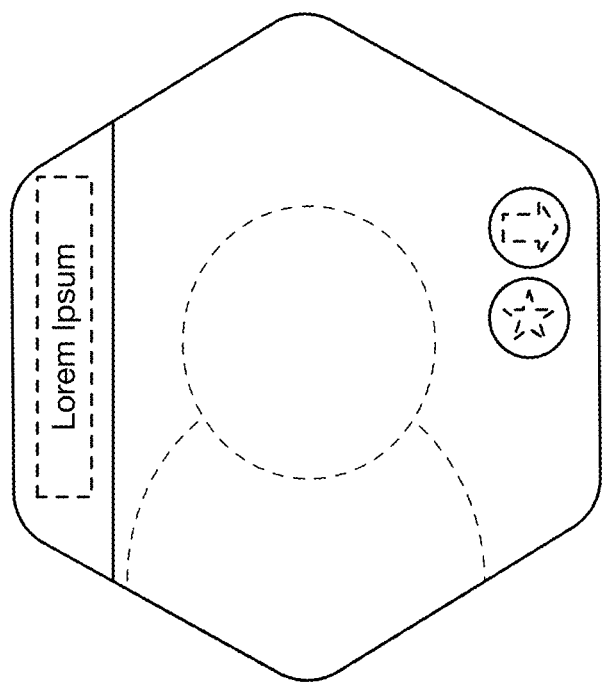
Figure 4G:
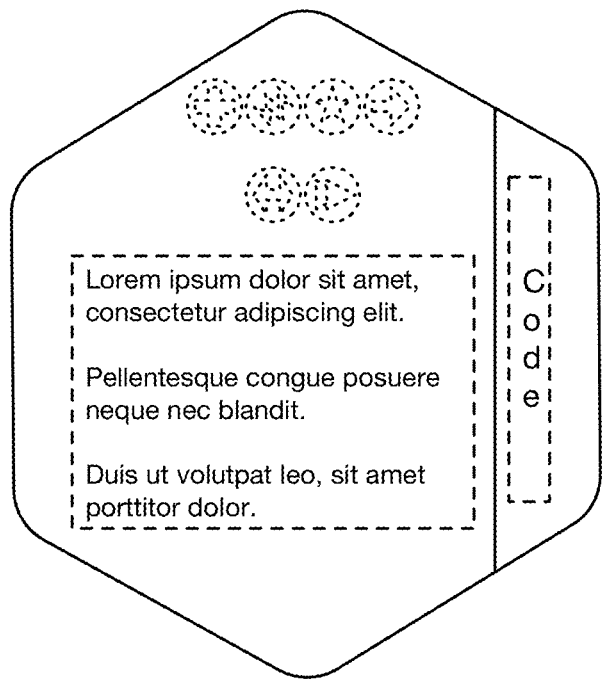

Another implementation of tokens may be utilized for entertainment or in games, with tracking and authentication of trades or exchanges of tokens between users, and augmented reality systems applying or enforcing gameplay rules and providing animations or other media during play. For example, FIGS. 4A-4G are illustrations of an example implementation of physical game tokens for use with a multi-user augmented reality system. FIGS. 4A-4C show example hexagonal tokens, which may be referred to variously as game tokens, hexagonal tokens, flexible tokens, flexagons, or by similar terms. Each token may have a front surface and rear surface with graphics, text descriptions, numeric values or symbols, and/or other information. For example, FIG. 4A shows an example of a token associated with a trio of player and including a point value (e.g. CP 120) and lightning symbol; FIG. 4B shows an example of an environmental modifier token including a text description and rule modification; and FIG. 4C shows an example of a player modifier token including a text description and rule modification. Images on each token may include embedded watermarks or steganographic encoded data codes for recognition by a camera of a client device to allow retrieval of corresponding media for display within an augmented reality environment, or game play modifiers or values to be applied during game play by the device (e.g. when calculating scores or determining whether placement of a token is valid during a turn). In some implementations, the images themselves may be used to retrieve the corresponding media for display. FIGS. 4D and 4E are images of a token front and back, with additional information included, along with a unique token identifier encoded as a barcode on the back of the token. This code may be used in place of or in addition to steganography or watermark encoding of images on the front of the token. For example, in some implementations, a code encoded on a front of a token may be specific to the entity associated with the token, but not specific to the individual token (e.g. a code identifying an entity embedded in an image on the front of the token and appearing on every token associated with the same entity). Such a code may be recognized and decoded by an augmented reality system to display content corresponding to the entity within the augmented reality environment (e.g. player or environmental animations, images, recorded videos, etc.). The code on the rear of the token (e.g. the barcode as shown in FIG. 4E, a QR code, or any other type of code) may be token-specific and may encode the unique identifier for that token, allowing token-specific authentication and exchange recordation as discussed above. Thus, for example, several hundred tokens associated with a specific entity may have identical front faces with the same code for the entity; and may have similar but different rear faces with unique codes for each token. Similar to FIGS. 4D and 4E, FIGS. 4F and 4G are generic illustrations of a front and rear face of an implementation of a token. The elements shown may be present or absent in any location, depending on implementation or design, and additional elements may be included in various implementations.

As discussed above, in some implementations, unique codes placed on a token may correspond to blockchain addresses at which a record for the token may be retrieved. In some implementations, a user may capture an image of the code (e.g. barcode, QR code, alphanumeric code, etc.) and may look up the record at the address identified in the code. In a similar implementation, the user may manually enter the code (e.g. as an alphanumeric code via a keyboard). Depending on the length of the code, this may be difficult or time-consuming and prone to entry errors. To make this easier, and simultaneously to add some further security to the codes, in another implementation, the blockchain address for the token record may not be based on the code on the token, but may be instead based on other information of the token (e.g. player name, jersey number, stats, etc.). For example, these and/or other values may be concatenated and hashed to generate the blockchain address for the token. Rather than entering a complicated code manually, a user may instead enter the player's name (or select it from a dropdown menu in an application or on a website), select the player's team and/or jersey, select stats, etc. For example, given the example token of FIGS. 4D and 4E, a user wishing to verify the authenticity and ownership of the token may access an application or website and enter or select, via a menu, information on the token, such as the player's team (e.g. the Golden State Warriors), the player's name (e.g. Klay Thompson), the abilities (e.g. transition slowdown, Aussie-go-round, pass-fake finger roll, etc.), and/or any other such information, at least some of which may be unique to the token (for example, other Klay Thompson tokens may have different abilities, such that entry of the set of abilities uniquely identifies this particular token). A blockchain address may be generated from the entered information (e.g. by concatenating the information, converting the resulting string to hexadecimal, and calculating a hash value, or any other such method). A record may be retrieved at the address, and the record may be associated with an alphanumeric code (such as "apeglic9pd" as shown in FIG. 4E). The alphanumeric code may be displayed for the user, and they may compare the code to the code on the token to be sure it is correct, verifying that the token is authentic.

Figure 5:
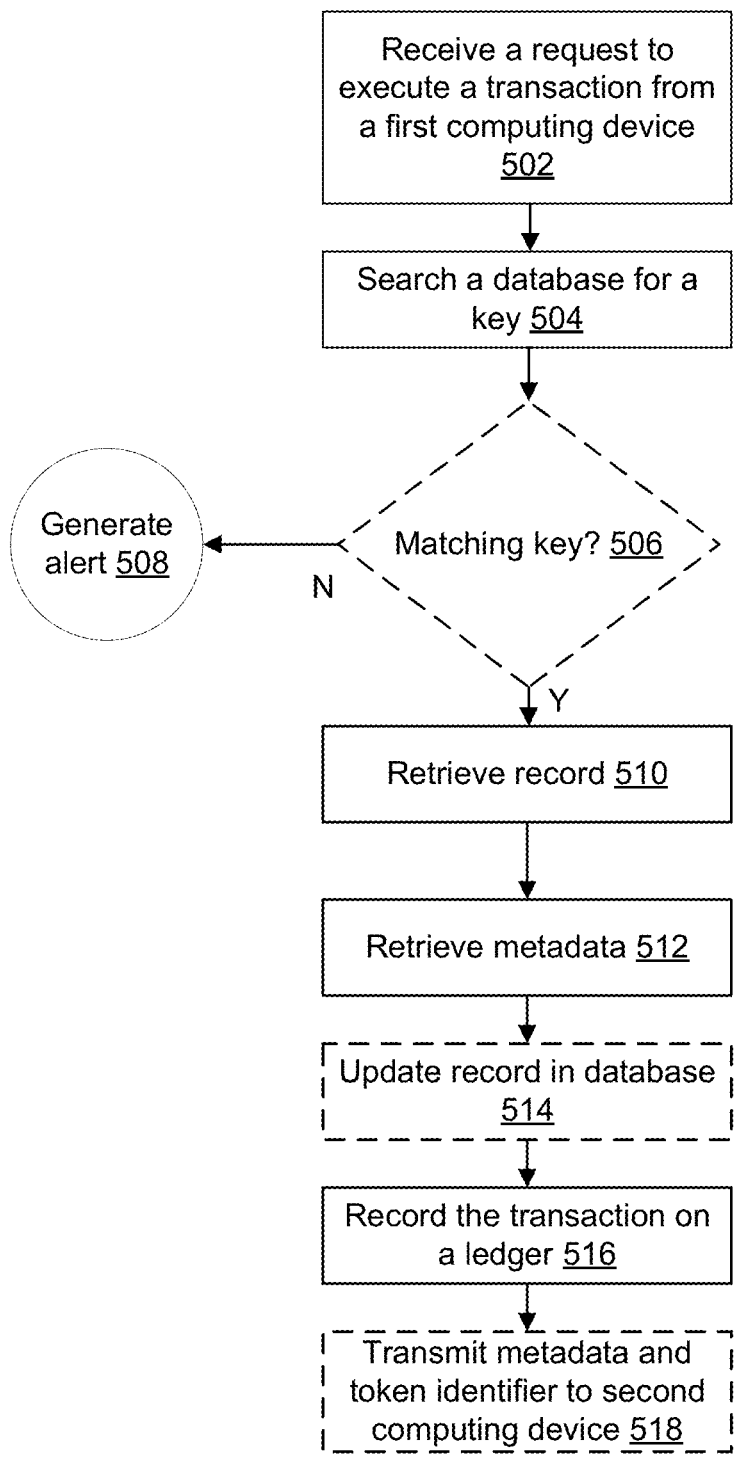
FIG. 5 is a flowchart of an implementation for ledger memory resource reduction.

FIG. 5 is a flow chart of an implementation of a method for reducing the memory requirements for storing data for an augmented reality environment. At step 502, a computing device in communication with a centralized or distributed ledger may receive, from a computing device associated with a first user account (e.g., a computing device processing the first user account), a request to execute a transaction to transfer ownership of a token (e.g., a physical token) from the first user account to a second user account. The computing device may be a node that helps to maintain the ledger or may be a separate computing device that has previously established a communication channel with one or more of the nodes that maintain the ledger. In some implementations, the ledger may be a blockchain that is distributed and is publically accessible (e.g., Bitcoin, Dogecoin, Ethereum, etc.) or a private blockchain that is only accessible to certain subset of individuals with write access to the blockchain such as individuals who have a wallet for an augmented reality game for which the blockchain is storing ownership records.

In some implementations, the request may include an identifier of the token for which ownership is being transferred. The identifier may be a numerical, alphanumerical, or alphabetic string that individually identifies the token. The token may be a token that corresponds to an entity of an augmented reality game, such as an augmented reality game involving basketball players. In one example, a single entity or player may be represented by a large number of tokens such that multiple users may have tokens that correspond to the same entity in a many-to-one relationship. The token identifier for the token may individually identify the token from all of the tokens that correspond to the entity. In some implementations, the token identifier may be written on the physical token such as a string or a barcode.

At step 504, the first computing device, may search a database that includes records for individual tokens that correspond to the augmented reality game mentioned above. The database may be a database stored within the first computing device or a database stored within a remote computing device. The database may store a record for each token. For example, each token with a unique token identifier may have its own record in the database. Each record may store metadata about the respective token in various fields. Examples of such fields may include the current owner of the token, a transaction history indicating the history of ownership of the token, an event history of the token that indicates various events that have occurred to the token (e.g., the token moved out of the country, the token was damaged, etc.), any signatures on the token, an entity identifier (e.g., a name of the entity represented by the token), an entity type (e.g., a level or status such as rookie, All-Pro, All-Star, MVP, etc.), etc. In some implementations, metadata is stored in a single field or a combination of data-specific fields and one or more general fields. In some implementations, the record may also include the data for an animation for the token or a pointer to the address from which such an animation may be accessed.

At step 506, the first computing device may determine if there is a matching key in the database. The first computing device may search the database using the token identifier received in the request as an index to identify the token record for the token being transferred in the transaction. The first computing device may identify the different token identifiers (e.g., keys) in the database that correspond to records for different tokens and determine if any of the stored token identifiers match the token identifier received in the request. If there is not a matching token identifier, at step 508, the first computing device may generate an alert indicating a record for the token could not be found. The first computing device may transmit the alert to the first computing device or a second computing device associated with the second user account. In some implementations, if there is not a matching token identifier, the transaction may be voided and not executed on the ledger. In some implementations, the first computing device may still execute the transaction on the ledger but may not be able to retrieve any metadata about the token if the first computing device is not able to identify a matching token identifier in the database.

However, if the first computing device can identify a matching token identifier, at step 510, the computing device may identify and retrieve the record that corresponds to the matching token identifier (e.g., identify the record based on the record's stored relationship with the matching token identifier). The first computing device may retrieve the record by accessing the data within the record and/or by retrieving the entire file of the record from memory. At step 512, the first computing device may identify the metadata that is stored in the record such as any events that have occurred to the token, any animation files or animation pointers for the token, any signatures on the token, an ownership history of the token, etc. The first computing device may identify the metadata by extracting the metadata from the record.

In some implementations, at step 514, the first computing device may update the record for the token to indicate the change in ownership. For instance, the first computing device may update an ownership field-value pair of the record to indicate ownership of the token is being transferred from the first user account to the second user account. In doing so, the first computing device may add account identifiers for the first and/or second user accounts to the ownership field-value pair. In some implementations, the first computing device may indicate the change in ownership with a note in a general field of the record.

At step 516, the first computing device may record the transaction on the ledger. The first computing device may record the transaction on the ledger in a new record indicating that ownership of the token has transferred from the first user account to the second user account. In doing so, the first computing device may create the record to include identifiers of the first user account and the second user account and the token identifier as the data of the record. In some implementations, the account identifiers and/or a short phrase indicating the transfer of ownership of the token and the token identifier are the only pieces of data that are stored in the record. Accordingly, each time a new record gets added to the ledger, only the small amount of data indicating the transfer of ownership needs to be processed to validate the record. This may help avoid processing the data about the token, which can be a significant amount of data, especially if the data included a video animation for the token. If a user wishes to view the token-specific metadata about the token, the user can access such data from the database that is separate from the ledger and that does not need to be processed for validation each time new data gets added to the database. Thus, the system enables ownership of individual tokens to be confirmed over time using a ledger and for each token to have token-specific data without requiring excessive processing power to maintain a chain of ownership of the token. This is a significant advance given that some ledgers are starting to require enough energy to power entire countries with the amount of data that is stored in each record.

In an example implementation, the ledger may be a blockchain that is maintained by multiple nodes. Upon receiving the transaction request transferring ownership of the token from the first user account to the second user account, the first computing device may append a block to the blockchain. The first computing device may append the block to the blockchain by creating a hash based only on the first account identifier, the second account identifier, the token identifier, and/or the address of the previous block, such that the block may attach to the blockchain and only include the data that is necessary to indicate the transaction occurred. In some implementations, the hash may be further based on a string containing a few characters indicating the transfer of ownership between the two accounts. The hash may not be based on any metadata for the token. Thus, each time the nodes that maintain the blockchain validate a new transaction or the blockchain itself, only a small amount of data needs to be processed. Previous systems would store any metadata about the token in the block with the account identifiers and require such data to be used to create the hash for the block. The systems and methods described herein may avoid using this data by using a separate database to store the data (e.g., a database that does not require any validation). A token identifier for the token may act as a key to map the new block for the transfer to the record for the token, so the token may still have metadata that is specific to the token and the system maintaining the ledger can avoid using processing resources to validate the metadata. Thus, by implementing the systems and methods described herein, a system may avoid using too much energy and processing power when validating blocks for transactions involving augmented reality tokens.

At step 518, the first computing device may transmit the metadata that the device retrieved from the database to the second computing device associated with the second user account that is receiving ownership of the token. The first computing device may transmit any subset of the metadata that it retrieves from the database to the second computing device such that a user of the second computing device may view information about the token. For example, the first computing device may transmit data for the token indicating that it was signed by a real-world entity (e.g., an NBA basketball player) that the token represents, the video file for an animation for the token, and a value for the token. The second computing device may receive the token identifier of the token and the metadata and display the token identifier and the metadata. Displaying this data to the user after the first computing device receives the transaction request may illustrate to the user that received the token that the user now owns the correct token and that the token has indeed been signed by the entity that the token represents. Instead or additionally, the second computing device may store the token and the metadata in an application (e.g., an application that enables an augmented reality game to be played) such that the animation in the metadata may be easily accessed. In some implementations, the second computing device may add the animation for the token to a cache of the second computing device so the animation may be easily retrieved upon the corresponding physical token being scanned by the application.

As described above, using a centralized or distributed ledger to prove ownership of physical tokens for an augmented reality game may enable a computing device to maintain a record of a chain of ownership of a particular token. For instance, the first computing device may receive, from a third computing device, a history request for a chain of ownership for the token that was transferred to the second user account. The history request may include the token identifier for the token. Upon receiving the request, the first computing device may use the token identifier as an index and search the ledger for records that contain the token identifier. The first computing device may identify any records (or blocks in the case in which the ledger is a blockchain) that contain the token identifier and identify and retrieve any account identifiers that indicate the previous owners of the token from the records. The first computing device may transmit the account identifiers to the requesting computing device such that a user at the computing device may view a history of the token's owners. Because the ownership history may be stored on a ledger such as a blockchain, the user can be reasonably certain the ownership history is accurate and has not been tampered with.

Accordingly, the systems and methods discussed herein provide for multi-user remote augmented reality environments. Although primarily discussed in terms of a pair of computing devices, transmissions identifying objects and their positions within the environment may be provided to a plurality of computing devices, with each device rendering virtual objects corresponding to physical objects identified by remote devices in an augmented reality display mixed with a locally captured image or video of an environment with local physical objects. The computing devices, in addition to providing the augmented reality environment, may also apply rules or policies based on the detected objects and/or their positions (including additional rules based on combinations of objects or their positions, such as interactions between two objects such as one chess piece capturing another, identifying card hands, totaling dice counts, applying actions or environmental effects from cards of a collectible card game, etc.).

In one aspect, the present disclosure is directed to a method for generating an augmented reality environment. The method may include receiving, by an application executing on a computing device, a real-time video feed captured by an image-capture device; presenting, by the application, the real-time video feed on a display of the computing device; identifying, by the application, an image on a physical token from the real-time video feed; selecting, by the application, an animation from a set of one or more animations based on the identified image; adding, by the application, the animation to the real-time video feed at an animation position above the physical token. The method may also include presenting, by the application on a display of the computing device, the real-time video feed with the added animation.

In some implementations, the method includes adding the animation to the real-time video feed by generating, by the application, a three-dimensional virtual environment; inserting, by the application, an indication of the physical token at a virtual position within the three-dimensional virtual environment; and adding, by the application, the animation to the three-dimensional virtual environment at the animation position a first predetermined distance above the virtual position. In a still further implementation, the method may further include retrieving, by the application, a token identifier for the token from a centralized or distributed ledger using an identifier of a user account; selecting, by the application, the animation from a memory of the computing device, responsive to the animation being associated with the token identifier; and storing, by the application, the animation in a cache of the computing device. Adding the animation to the real-time video feed may include retrieving, by the application, the animation from the cache.

In some implementations, adding the animation to the real-time video feed may include generating, by the application, an overlay comprising the animation; and placing, by the application, the overlay over the real-time video feed at the animation position above the physical token. In some implementations, the identified image is a first image, the physical token is a first physical token, and the animation position is a first animation position. The method may further include identifying, by the application, a second image on a second physical token from the real-time video feed; determining, by the application, a second animation based on the second image; and adding, by the application, the second animation to the real-time video feed at a second animation position above the second physical token. Presenting the real-time video feed with the added animation may further include presenting, by the application, the added first animation concurrently with the added second animation.

In some implementations, the method may further include determining, by the application, that the first image is within a predetermined distance of the second image; identifying, by the application, a third animation responsive to the determination that the first image is within the predetermined distance of the second image; and replacing, by the application, the first animation with the third animation. In some implementations, replacing the first animation with the third animation includes replacing, by the application, the first animation and the second animation with the third animation. In still further implementations, the method may include storing, by the application, a plurality of player profiles, each of the plurality of entity profiles corresponding to a different token image and having one or more attribute-value pairs at least including an animation attribute-value pair. Identifying the first animation may include identifying, by the application, the first animation from a first attribute-value pair of a first entity profile that corresponds to the first image, and identifying the third animation may include identifying, by the application, the third animation from a third attribute-value pair of the first entity profile. In some implementations, selecting the animation may include comparing, by the application, the identified image to one or more images in a database; identifying, by the application, an entity profile of the image responsive to determining the image has a similarity to a corresponding image in the database that exceeds a threshold; and determining, by the application, the animation from the entity profile.

In another aspect, the present disclosure is directed to a method for minimizing the memory resources that are required to maintain a distributed or centralized ledger for a virtual environment. The method may include receiving, by a first computing device in communication with a centralized or distributed ledger from a computing device associated with a first user account, a request to execute a transaction transferring ownership of a token from the first user account to a second user account, the request comprising a token identifier of the token; retrieving, by the first computing device from a database separate from the centralized or distributed ledger, metadata about the token using the token identifier; and recording, by the first computing device on the centralized or distributed ledger, the transfer of ownership of the token from the first user account to the second user account in a record, the record comprising the token identifier and account identifiers of the first user account and the second user account.

In some implementations, retrieving the metadata about the token using the token identifier includes searching, by the first computing device, the database for a key corresponding to the token identifier; and retrieving, by the first computing device, a record corresponding to the key. In some implementations, retrieving the metadata about the token using the token identifier includes updating, by the first computing device, an ownership field of a token record associated with the token stored in the database to include the account identifier of the second user account.

In some implementations, the centralized or distributed ledger includes a blockchain, and wherein generating the record includes appending, by the first computing device, a block to the blockchain by generating a hash based at least on the token identifier and the account identifiers of the first and second user accounts, wherein the hash is not based on the metadata of the token. In some implementations, retrieving the metadata about the token includes retrieving, by the first computing device, an entity identifier of an entity with which the token is associated and an entity type of the token. In some implementations, retrieving the metadata about the token further includes retrieving, by the first computing device, an identifier of an add-on status for the token, the add-on status comprising a signature, an event, or a value.

In some implementations, the method may further include receiving, by the first computing device from a third computing device, a history request for a chain of ownership of the token, the history request comprising the token identifier; identifying, by the first computing device, records in the centralized or distributed ledger that include the token identifier; retrieving, by the first computing device, account identifiers indicating the previous owners of the token from the identified records; and transmitting, by the first computing device, the account identifiers to the third computing device responsive to the history request. In some implementations, retrieving the metadata about the token includes retrieving one or more animations each depicting an entity associated with the token moving according to a set pattern. In some implementations, transmitting the token identifier and the metadata about the token to the second computing device causes the second computing device to store the token identifier and the metadata in an application.

In another aspect, the present disclosure is directed to a system for minimizing the memory resources that are required to maintain a distributed or centralized ledger for a virtual environment. The system may include a first computing device comprising a network interface in communication with a computing device associated with a first user account and a memory device storing a centralized or distributed ledger. The processor may be configured to receive, via the network interface from the computing device associated with the first user account, a request to execute a transaction transferring ownership of a token from the first user account to a second user account, the request comprising a token identifier of the token; retrieve, from a database separate from the centralized or distributed ledger, metadata about the token using the token identifier; and record, on the centralized or distributed ledger, the transfer of ownership of the token from the first user account to the second user account in a record, the record comprising the token identifier and account identifiers of the first user account and the second user account. In some implementations, the first computing device retrieves the metadata about the token using the token identifier by searching, by the first computing device, the database for a key corresponding to the token identifier; and retrieving, by the first computing device, a record corresponding to the key.

B. Systems and Methods for Automated Visual Code Generation

Generating a compelling augmented reality environment that users will believe and with which users will interact can involve generating physical and virtual tokens that store or represent data objects that may be specific to the tokens. Often times, when generating such tokens, operators may manually input the values to the tokens including any description of the entities that the tokens represent and/or unique identifiers for the tokens. For example, for an augmented reality game involving different entities, an operator may manually input different abilities and statistics for the entities as well as identifiers that are specific to each token that help differentiate the tokens from each other. The user input may be pasted or added to the tokens such that the codes may be read by augmented reality devices to process the various characteristics of the entities represented by the tokens. Because this is a manual process, such techniques may be prone to human error. Such errors may not be caught until the tokens are published or transferred to a user of the augmented reality environment. Accordingly, the faulty tokens may not be able to be processed or may be processed with invalid characteristics as a result of having an invalid code.

Implementations of the systems and methods discussed herein may avoid the aforementioned deficiencies and provide for automated visual code generation. A processor can automatically process files of arrays to generate tokens and codes for the tokens without user input, providing the processor with the ability to repeatedly generate tokens with accurate codes that can be read by augmented reality devices. The processor can convert the arrays into image files that contain optical and textual characteristics of the entities that the tokens represent. The image files may then be processed to generate a visual code for each image file that can be read to activate the character or entity represented by the respective image file. Advantageously, by automating the token and code generation process, the system can quickly process tens of thousands of tokens and generate individual codes for the tokens based only on the image files without introducing any errors into the tokens, thus reducing the number of processing problems that may otherwise occur when augmented reality devices read the tokens and providing an improved and engaging augmented reality user experience.

Figure 6A:
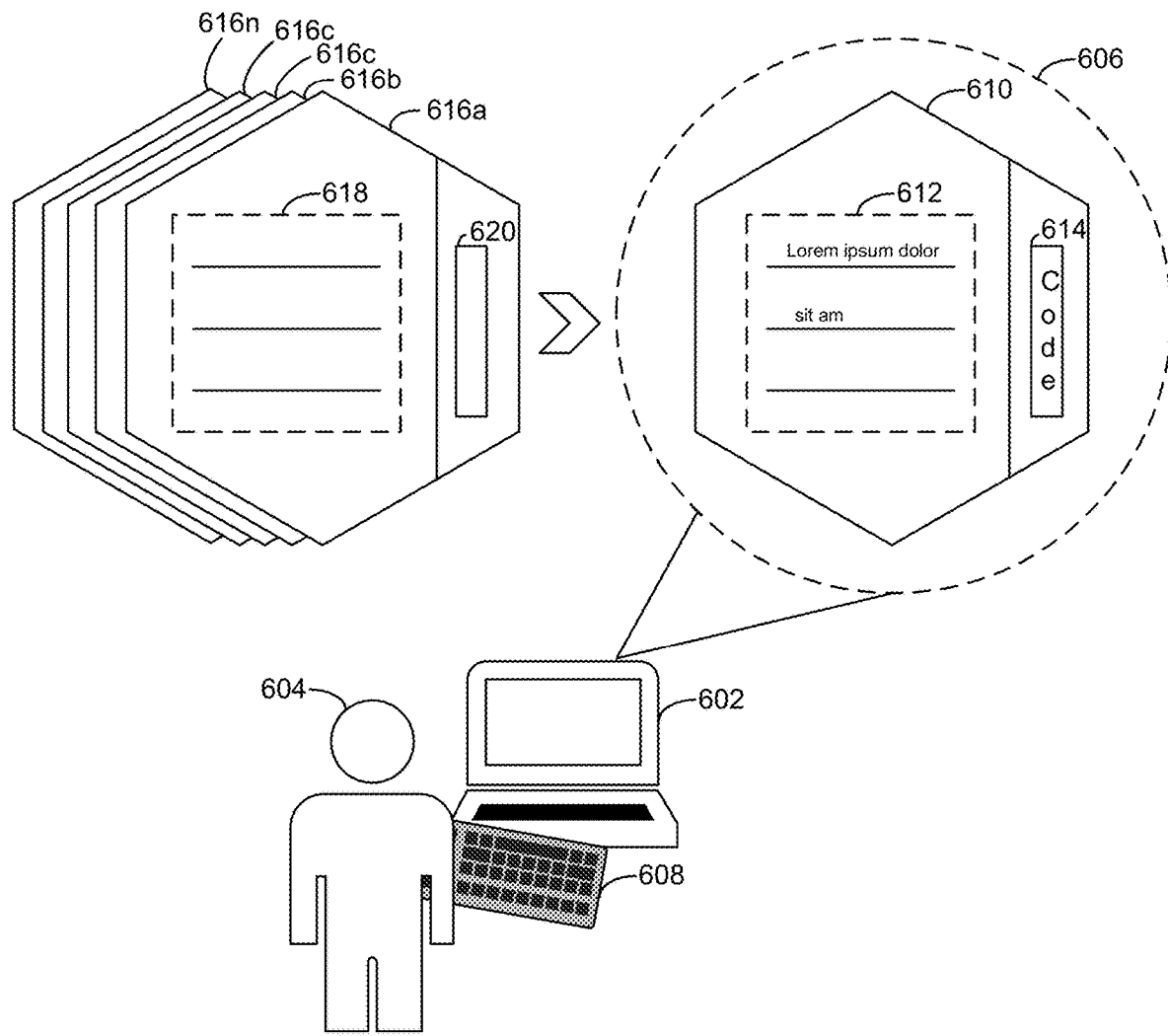
FIG. 6A is an illustration of a user manually generating a token for an augmented reality system, according to some implementations.

FIG. 6A is an illustration of a user manually generating a token for an augmented reality system. A device 602 of a user 604, which may comprise a smartphone, tablet computer, desktop, laptop, or other such computing device, may include a display (illustrated as magnified view 606) and a keyboard 608. The user 604 may use the device 602 to create tokens (e.g., physical and/or virtual tokens) that may be processed by augmented reality devices to render virtual images of entities or characters that correspond to the individual tokens. To do so, via a user interface displayed on the device 602, the user 604 may view blank tokens (e.g., tokens that do not contain any data) and type data onto the blank tokens, such as the codes that augmented reality devices read to activate the tokens. For example, the user 604 may populate the blank token 610 with characteristic data 612 and/or a code 614 (e.g., a unique identifier for the blank token 610) by typing the characteristic data 612 and/or the code 614 into the device 602 via the keyboard 608. After typing in the information to populate the blank token 610, the user 604 may perform the same process for a blank token 616a by populating characteristic fields 618 with characteristic data and/or a code field 620 with a code for the blank token 616a. The user 604 may similarly populate the blank tokens 616a-n (which may include tens of thousands of blank tokens) with characteristic data to generate populated tokens that each have their own codes that can be read to be activated.

Because token generation often involves a user typing in data for potentially thousands of individual tokens, the method can often result an improper token with a code that cannot be read or a token with improper characteristics. Such errors may result from a user improperly typing information into the token. For example, when generating an augmented reality game token a user may improperly type in a characteristic for the token that gives the token too much power in the game (e.g., an attack power that is too high). Thus, when the token is activated or read in a game, the user that played the token may have an unfair advantage over another player that may play another token that represents the same entity but has the correct characteristics. In another example, a user may improperly type in a code for a token that causes the token to be unreadable. In such situations, a user may attempt to play the token in a game but augmented reality devices that attempt to read the token may not be able to do so and instead output an error message. Thus, defective tokens may be effectively unusable because of user errors that may occur when generating such tokens.

Figure 6B:
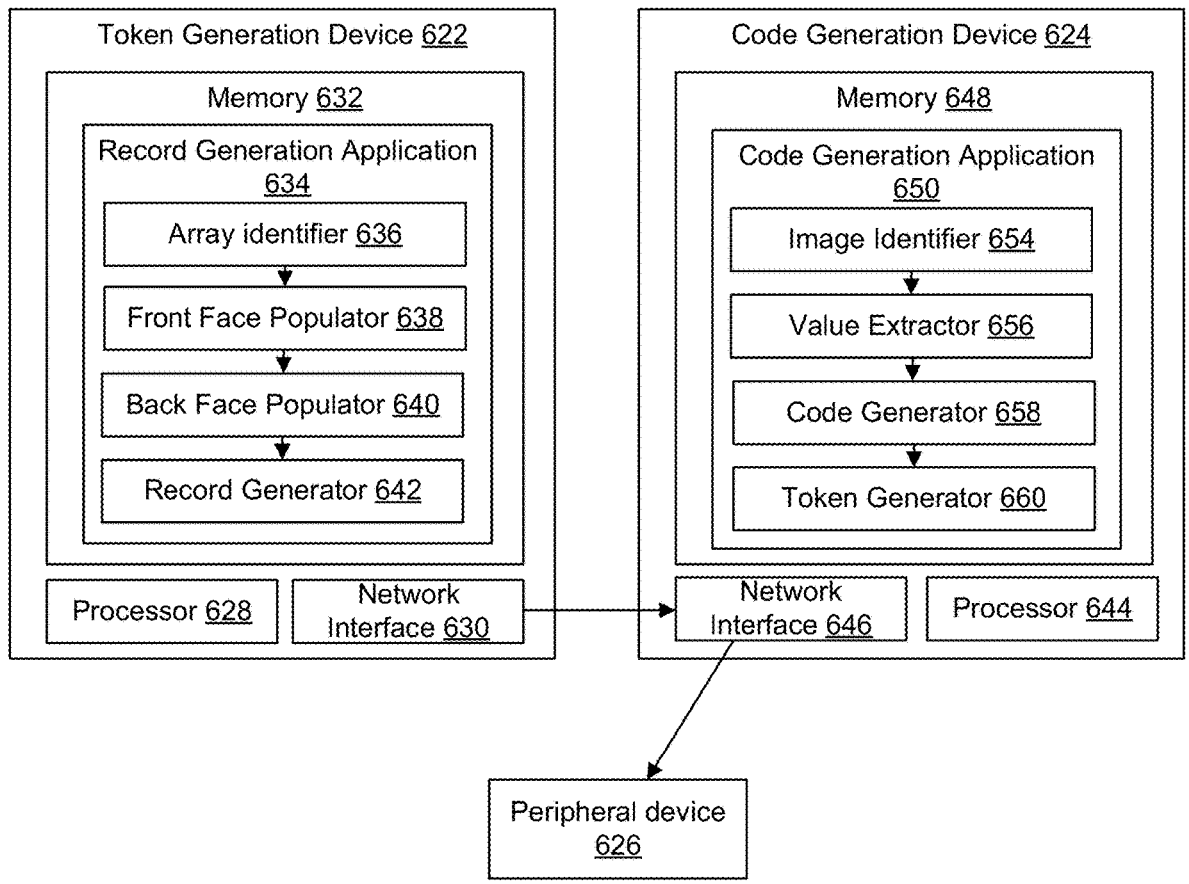
FIG. 6B is a block diagram of a system for automated visual code generation, according to some implementations.

FIG. 6B is a block diagram of a system for automated visual code generation. As discussed herein, a token generation device 622 may communicate with a code generation device 624 to automatically generate tokens for an augmented reality environment (e.g., tokens that represent different entities for an augmented reality game). Token generation device 602 may be or include any computing device such as a server or series of servers or other such devices that may generate a record containing multiple image files (e.g., files in a PDF or PNG format) for multiple tokens based on one or more arrays and send the record to the code generation device 624 via a network for further processing. The code generation device 624 may receive the record and generate visual codes uniquely identifying the tokens in the image files based on the data within the files. The code generation device 624 may add the generated codes to the respective image files and send (e.g., over a wired or wireless network) the updated image files to a peripheral device 626 (e.g., a paper printer, a three-dimensional printer, a controller of a manufacturing system, etc.) to be manufactured as physical tokens.

Token generation device 622 may comprise one or more processors 628 (including co-processors such as graphics processing unit (GPUs) or tensor processing units (TPUs)), and/or may communicate with other devices providing co-processing power (e.g. cloud-based processing units such as virtual computing devices, desktop computing devices connected via a network, etc. for performing object recognition). Token generation device 622 may also comprise one or more network interfaces 630, such as a wireless network interface (e.g. 802.11 or WiFi, cellular, or satellite network interface) and/or a wired network interface (e.g. Ethernet) for communicating with each other and/or with other computing devices via a network, such as a Wide Area Network (WAN) such as the Internet, Local Area Network (LAN), cellular network, broadband network, peer-to-peer network, or any other type and form of network. Although not illustrated, token generation device 622 may communicate via one or more additional devices, such as gateways, switches, routers, firewalls, accelerators, load balancers, security appliances, or other such devices. Token generation device 622 may further comprise one or more memory devices 632 (e.g. flash memory, hard drives, etc.) for storing applications such as a record generation application 634 as well as other applications (e.g. operating systems, media players, web browsers, social media applications, etc.).

The record generation application 634 may comprise an application, service, server, daemon, routine, or other executable logic for analyzing arrays of data in a file, generating a record containing image files for unfinished tokens (e.g., tokens without a unique visual code identifier) based on the values in the arrays, and transmitting a record comprising the image files to the code generation device 624. Record generation application 634 may receive (e.g., as uploads from a client device or from storage in the memory 632) files of arrays of values for generating tokens. The files may be or include text files or spreadsheet files that contain arrays that the record generation application 634 can separately read to populate blank tokens (e.g., files of tokens without any values on the faces of the tokens) and thus generate tokens. The record generation application 634 can transmit the generated tokens to the code generation device 624 in a record containing visual files for the generated tokens.

The arrays in the files may contain values that correspond to different entity characteristics or values and/or be associated with corresponding positions on blank tokens. Each array may correspond to a unique token. For example, each array may have a set number of index values that each correspond to a different entity characteristic (e.g., index values may correspond to a player name, a player level, a confidence point, icons to be included, base damage, unique token identifier, etc.). The values of the arrays may be user input numerical or alphanumerical values or strings at each of the index values of the arrays. In instances in which the file is a spreadsheet, the arrays may be individual rows where each column of the spreadsheet corresponds to a different characteristic and the values in the cells of the rows may contain values that correspond to the characteristics of the cells' respective columns. Individual files may contain tens of thousands of arrays that each correspond to individual tokens.

The record generation application 634 may comprise or execute an array identifier 636, which may comprise an application, service, server, daemon, routine, or other executable logic for identifying arrays in files. The array identifier 636 may retrieve files from memory and query the files for individual arrays that each correspond to a different token. For example, via a client device, a user may upload a file containing multiple arrays to the token generation device 622. Token generation device 622 may store the file in the memory 632 (e.g., in a cache). The array identifier 636 may retrieve the file and identify an array from the file responsive to the array having a matching value to a query value (e.g., a matching row value).

In some implementations, the record generation application 634 may comprise or execute a front face populator 638. The front face populator 638 may comprise an application, service, server, daemon, routine, or other executable logic for populating a front face of a blank token (e.g., an image of a blank token) with values from the identified array. The front face populator 638 may query the index values (e.g., predetermined index values in a text file or values in specific columns of a spreadsheet) of the array to extract the values at the respective index values. The front face populator 638 may identify portions of the front of the blank token that correspond to the index values from which the values were extracted and paste or place the extracted values at the corresponding portions of the blank token. For example, the front face populator 638 may query a value in a cell associated with a player name from an array in a spreadsheet. The front face populator 638 may retrieve the player name string from the cell and identify the portion or section of the front face of the blank token (e.g., a blank player card) that corresponds to player name. The front face populator 638 may place or paste the extracted player name on the identified portion. The front face populator 638 may similarly populate other portions of the front face of the token with values from the array.

In some cases, the front face populator 638 may use the values in the array as a look-up to identify the graphics that correspond to portions of the front face of the blank token. For example, the values may be keys that correspond to keys in a database of the record generation application 634 that stores different icons or backgrounds graphics (e.g., faceplates depicting the entity represented by the token) for the blank tokens. The front face populator 638 may identify keys from the array that correspond to different graphics in the database and compare the keys to the database to identify graphics from the database. The front face populator 638 may retrieve the identified graphics and place the graphics on the blank tokens at their respective locations.

In some implementations, the record generation application 634 may comprise or execute a back face populator 640. The back face populator 640 may comprise an application, service, server, daemon, routine, or other executable logic for populating a back face of the blank token with values from the identified array. Similar to the front face populator 638, the back face populator 640 may query the index values (e.g., predetermined index values in a text file or values in a specific columns of a spreadsheet) of the array to extract the values at the index values. The back face populator 640 may populate sections of the back face of the token comprising section titles, fields, damage identifiers, etc., of the back face of the blank token with the values from the arrays. For example, different index values of the array may correspond to different fields on the back face of the token. The back face populator 640 may identify the values from the array that correspond to the fields on the back face of the token and update the back face of the token accordingly. Additionally, the back face populator 640 may add any graphics to the back face of the token using the index values of the array as a look-up similar to front face populator 638. Thus, the front face populator 638 and the back face populator 640 may generate an image file for a token based on the array in the file that contains images of the front face and/or the back face of the token.

In some implementations, the record generation application 634 may comprise or execute a record generator 642. The record generator 642 may comprise an application, service, server, daemon, routine, or other executable logic for generating a record with the image files for individual tokens that the front face populator 638 and the back face populator 640 generate based on individual arrays. The record generator 642 may save the generated image to a record (e.g., a folder) that may contain one or more other similarly generated image files from the file of arrays. In some cases, the record generator 642 may save the files to a physical storage device (e.g., a compact disk, a USB drive, etc.) so the files can be easily transported in instances in which the record file size is too large to transmit over a network, which may be an issue in cases in which the record contains thousands of image files for different tokens.

The components of the record generation application 634 may repeatedly generate image files for tokens for individual arrays of a file and save the image files to a record for each array of the file. Upon generating an image file for the last array of the file, record generator 642 may transmit the generated record to the network interface 630 to transmit the record to the code generation device 624 for further processing otherwise store the record on a physical storage device to be then uploaded to the code generation device 624.

The code generation device 624 may comprise one or more processors 644, one or more network interfaces 646, and/or one or more memory storage devices 648. Each of components 644-648 may be similar to the corresponding components 628-634 of the token generation device 622. The memory storage devices 648 may store applications such as a code generation application 650 as well as other applications (e.g. operating systems, media players, web browsers, social media applications, etc.).

The code generation application 650 may comprise an application, service, server, daemon, routine, or other executable logic for generating visual codes for the image files of tokens that are included in records that are generated by the token generation device 622. The code generation application 650 may receive the record from network interface 646 and/or from a physical memory storage device and process the image files contained in the record. The code generation application 650 may store the record or the image files in the memory 648, retrieve the individual image files from the memory 648, and generate visual codes for each image file base on the contents of the files (e.g., the values on the tokens depicted in the image files). The code generation application 650 may append or paste the generated codes to the respective tokens and transmit the tokens to the peripheral device 626 to be manufactured into a physical token.

In some implementations, the code generation application 650 may comprise or execute an image identifier 654. The image identifier 654, may comprise an application, service, server, daemon, routine, or other executable logic for identifying image files in records. The image identifier 654 may retrieve the record that the code generation device 624 received from the token generation device 622 from the memory 648 and identify individual image files from the record.

In some implementations, the code generation application 650 may comprise or execute a value extractor 656. The value extractor 656 may comprise an application, service, server, daemon, routine, or other executable logic for extracting values from the image file identified by the image identifier 654. The value extractor 656 may identify and/or extract values from one or both sides of the token represented in the image file by using object recognition techniques (e.g., optical character recognition) on the images and identifying the values on the token. In some implementations, the value extractor 656 may extract values at predetermined locations on the tokens while avoiding other values.

In some implementations, the code generation application 650 may comprise or execute a code generator 658. The code generator 658 may comprise an application, service, server, daemon, routine, or other executable logic for generating a visual code for individual tokens. The code generator 658 may generate a visual code for a token by first concatenating the values that were extracted from the token by the value extractor 656. Upon concatenating the values, the code generator 658 may use a function (e.g., a hashing function) on the concatenated value to generate an identifier for the token. Because one of the values that the value extractor 656 extracts from the token may be a unique value to the token, the identifier that the code generator 658 generates may be a unique identifier to the token.

In some implementations, upon generating the unique identifier, the code generator 658 may generate a code based on the unique identifier. For example, the code generator 658 may generate a visual code such as a barcode, a QR code, an alphanumeric code, or another encoding of the unique identifier that can uniquely identify the token.

In some implementations, the code generation application 650 may comprise or execute a token generator 660. The token generator 660 may comprise an application, service, server, daemon, routine, or other executable logic for generating a token using codes generated by the code generator 658. For example, the token generator 660 may identify a visual code generated by the code generator 658 and the token on which the visual code is based. The token generator 660 may paste or place the generated visual code at a pre-determined location on the token to generate a finalized version of the token.

The code generation application 650 may generate visual codes for any number of image files that may be contained in an array and send the completed tokens to the peripheral device 626 to be manufactured. Thus, the code generation application 650 may generate thousands of tokens based only on image files and without processing any arrays or relying on user inputs to generate the codes for the tokens, which could result in improper codes on manufactured tokens resulting from human errors and for tokens with such improper codes to malfunction when a user attempts to activate them in an augmented reality environment.

In some implementations, instead of the code generation application 550 generating the visual codes for the image files, the record generation application 534 may generate the codes. For example, the record generator 542 may extract values from the front or back faces of individual image files, concatenate the values for each of the individual image files into strings, and use a function (e.g., a hashing function) on the strings to generate unique identifiers for the tokens. The record generator 542 may then place the unique identifiers on pre-determined locations of the image files similar to the token generator 560 of code generation device 524. Record generator 542 may generate any number of such image files and transmit the image files to the code generation device 524 to forward to the peripheral device 526 and/or to the peripheral device 526 itself so tokens can be manufactured from the image files.

In some implementations, the unique identifiers may be values in the arrays from which the image files are being generated (e.g., values that were generated using a random number generator). In such implementations, the record generator 542 (or either of the front face populator 538 or the back face populator 540) may retrieve the unique identifiers from the arrays and populate the image files or tokens with the unique identifiers either as the unique values themselves or after converting the unique identifiers into codes such as barcodes, QR codes, or watermarks. The record generator 542 may populate the image files at predetermined locations within the image files or tokens. The record generator 542 may then transmit the image files in a record to the code generation device 524 and/or the peripheral device 526 to be manufactured.

In some implementations, the record generator 542 may generate the unique identifiers and/or visual codes for the image files or tokens and transmit the unique identifiers and/or visual codes to the code generation device 524 separately from the image files (e.g., in a separate record or as separate values from the image files themselves). For example, the record generator 542 may determine unique identifiers and/or visual codes for image files of a record (e.g., determine the unique identifiers from the contents of the image files or by retrieving the unique identifiers from the arrays from which the token are being generated) and transmit the unique identifiers and/or visual codes to the code generation device 524 separately from the record containing the image files with stored associations (e.g., flags and/or settings) between the codes and the corresponding image files that indicate which image files correspond to the codes. The code generation device 524 may retrieve the identifiers and/or visual codes, if applicable convert any identifiers into visual codes, and place or paste the visual codes onto the respective image files. The code generation device 524 may then transmit the image files to the peripheral device 526 for manufacturing.

In some implementations, instead of retrieving the unique identifiers for the image files or tokens from an array or generating the unique identifiers from the data on the tokens, the record generator 542 and/or the token generator 560 may generate the unique identifiers using a random number generation technique. For example, for each token, the record generator 542 and/or the token generator 560 may use a random number generation technique to generate a numerical or alphanumerical unique identifier. The record generator 542 and/or the token generator 560 may then place the generated unique identifiers on the tokens as described herein.

FIG. 7A is a flow chart of an implementation of a method for automated visual code generation. At step 702, a data processing system (e.g., the token generation device 602, a client device, a server, a combination of servers, etc.) may receive an identification of a file. The file may be a file containing one or more arrays (up to thousands of arrays) such as arrays in a spreadsheet or text arrays. The arrays may contain values indicating different characteristics of a specific entity (e.g., player's name, player type, player level, confidence point, icons to be included in a token, player abilities, base damage, etc.) and, in some cases, an identifier of the array (e.g., a numerical value specific to the array). In cases in which the file contains a spreadsheet, the arrays may be divided into different cells of rows of the spreadsheet with each cell comprising a value for a different characteristic (e.g., each column of the spreadsheet may correspond to a different characteristic). In cases in which the file contains arrays in a text file, the different index values of the arrays may each correspond to a different characteristic (e.g., the second index value of each array in the text file may correspond to the same characteristic).

At step 704, the data processing system may determine if the received file contains any arrays. The data processing system may query the file using natural language processing techniques to identify any arrays. If the data processing system does not identify any arrays, the method may end and the data processing system may repeat steps 702 and 704 until the data processing system receives a file and identifies at least one array in a file.

However, if a file contains at least one array, at step 706, the data processing system may identify an array in the file. At step 708, the data processing system may identify a blank token (e.g., a file containing a blank template for a token) from memory. At step 710, the data processing system may determine characteristics for the front of the blank token based on the values in the identified array. The front of the blank token may be configured to contain data that identifies the entity that is associated with the token (e.g., the players name, a plate showing an image of the player, icons associated with the player, the player's level (e.g., basic, rising star, all-star, all-NBA, MVP, rookie, etc.)). The data processing system may identify the index values of the array that correspond to each of the characteristics of the front of the token, retrieve the values that correspond to the index values, and populate the front of the token with the retrieved values. For example, the data processing system may identify the player's name for the blank token and the player's level from the array and populate pre-determined portions of the blank token with the player's name and level. For any icon or graphical characteristics, the data processing system may identify the values that correspond to the icon or graphical characteristics and use the values in a look-up to retrieve the corresponding icons and/or graphical characteristics from memory. At step 712, the data processing system may place the retrieved icons and/or graphical characteristics on the blank token in the locations that correspond to the icons and/or graphical characteristics to generate the front of a token that can be used in an augmented reality environment.

At step 714, the data processing system may begin generating a back of the token and identify a section of the back of the blank token. The back of the blank token may have one or more sections that can each have one or more fields. In one example, in some implementations, each of the sections may correspond to a different "ability" that is associated with the token for a game. The section may have a title and one or more fields indicating actions that correspond to the section. For instance, a section may be entitled "Shot Annihilator" and include one field with a string "Roll the ball die. If 4-9: All positive Status FX on your PPP's active players are removed," and another field with a string "roll the ball die. If even: leave your OPP ice cold."

Optionally, each section may also have a value next to the strings indicating a value (e.g., amount of damage) that corresponds to the section. The back of the blank token may include any number of sections and any number of fields within each section.

At step 716, the data processing system may determine whether a field within the section has a value within the array. Each field within a section of the blank token may correspond to an index value of the array for the blank token. The data processing system may identify the index value of the array for a field and determine whether the array has a value (e.g., a string or an identifier that points to a location in memory from which a specific string may be retrieved) at the index value. If the index value of the array has a value that corresponds to the field, at step 718, the data processing system may retrieve the value and populate the field of the blank token with the value.

After populating the field with the value from the index value of the array or determining the index value of the array does not have a value for the field, at step 720, the data processing system may determine if the section has another field to populate with a value from the array. Steps 716-720 may be repeatedly performed until the data processing system does not identify another field for the section to populate with a value from the array.

At step 722, the data processing system may determine whether there is another section on the back of the blank token. If the data processing system identifies another section, the data processing system may repeat steps 714-722 until determining there is not another section on the back of the blank token.

Upon determining there is not another section on the back of the token, at step 724, the data processing system may determine characteristics of the back of the player token. These characteristics may include icons, values, and other graphical element elements that can placed at other locations outside of the sections on the back face of the blank token. The data processing system may determine the characteristics similar to how the data processing system determined characteristics for the front of the player token at step 710. For example, the data processing system may identify any values, icons, or graphical characteristics from the corresponding index values of the array for the token. The data processing system may place any values at their corresponding locations on the token and retrieve any icons or graphical characteristics from memory.

At step 726, the data processing system may place a graphical overlay over the back face of the token. The data processing system may place the retrieved icons and/or graphical characteristics on the back of the token at the locations that correspond to the icons and/or graphical characteristics to generate the back of the token.

In some implementations, the data processing system may retrieve a unique identifier from the array that corresponds to the individual token. The unique identifier may be any numerical or alphanumerical value and may be placed on either the front or back face of the token. In some implementations, the data processing system may paste or append the unique identifier to the back of the token as a non-visible code or a code that is not easily perceivable by humans, such as a watermark code within an image, an identifier encoded in IR reflective material within an otherwise visible image, etc. Thus, the data processing system may be able to create unique tokens with unique identifiers without distracting users with the identifiers.

At step 728, the data processing system may add the generated token to a record (e.g., file containing image file for one or both of the back face of the token and the front face of the token). In some implementations, the data processing system may convert the image of the token from one image format (e.g., PSD, PNG, PDF, BMP, JPEG, GIF, etc.) into another image format and add the converted image to the record. In some implementations, the data processing system may add the token directly to the record by saving the image file to the record without converting the image's format (in situations in which the image file as already in a pre-predetermined format).

At step 730, the data processing system may determine whether there is another array (e.g., another row or another text array) in the file. The data processing system may query the file for another array and, if the data processing system is able to identify another array, repeat steps 706-730 adding image files of tokens to the record at each iteration until the data processing system is not able to identify another array. The data processing system may repeat this process for any number of arrays without any user input, enabling the data processing system to automatically generate a record containing image files for thousands of tokens without worrying about any typographical errors that may cause defects in the tokens. At step 732, the data processing system may transmit the record to a remote device (e.g., a device of a manufacturer to be used to manufacture tokens based on the image files).

Figure 7B:
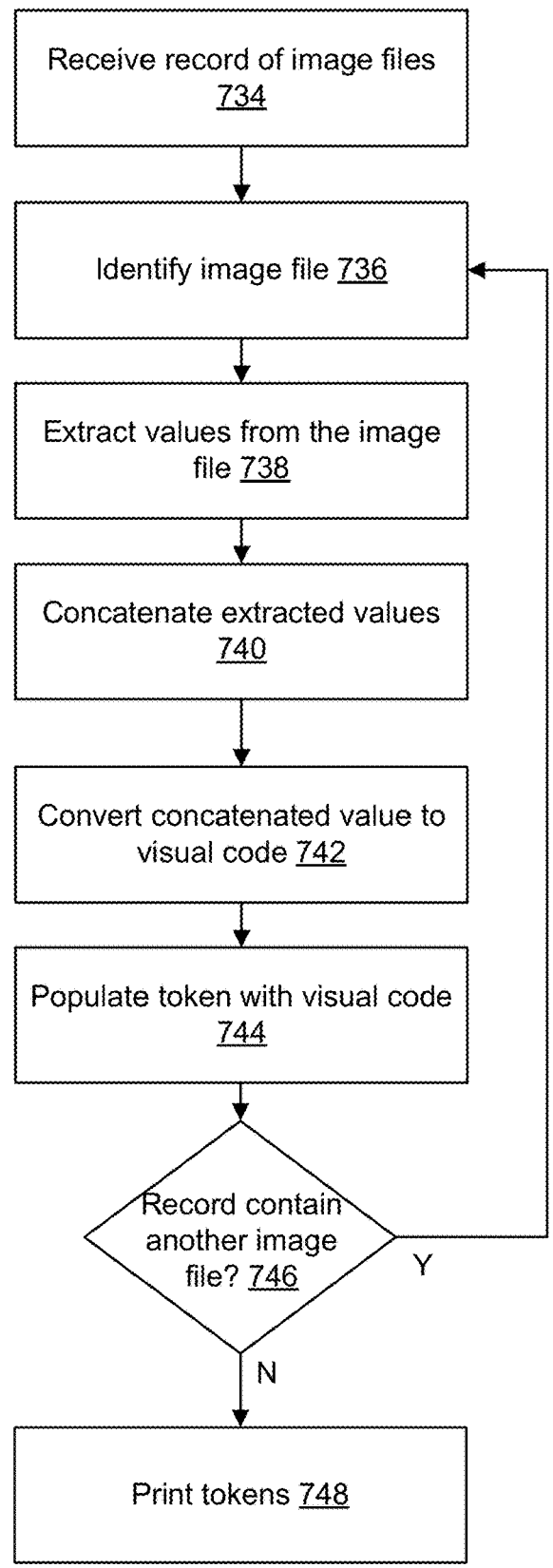

FIG. 7B is a flow chart of an implementation of another method for automated visual code generation. The method illustrated in FIG. 7B may be performed by a data processing system (e.g., a system provider or a manufacturer that manufactures tokens, the token generation device 602, a client device, a server, a combination of servers, etc.). The method may be performed after the method described with respect to FIG. 7A. For instance, the method may be performed after the data processing system described with respect to FIG. 7A transmits a record to the data processing system of FIG. 7B.

At step 734, the data processing system may receive a record of image files. The record may be a file comprising tens of thousands of picture files that each correspond to individual tokens (including the front and/or back faces of the tokens). The data processing system may receive the record over a network or from a physical disk in cases in which the image files are too large to transmit over the network. The individual tokens may be associated with the same and/or different entities from each other and correspond to different identifiers that are specific to the tokens as described herein. The data processing system may store the populated tokens in memory or in a cache upon receiving the tokens.

At step 736, the data processing system may identify n image. The data processing system may identify the image file from memory, the cache, or the disk upon querying the respective storage device. At step 738, the data processing system may extract values from the populated player token of the image file. The data processing system may extract values from one or both of the back and the front faces of the populated player token. To do so, the data processing system may use optical character recognition (OCR) or any other image processing techniques to segment or identify different words from the back of the player token (e.g., from the different fields or sections of the back of the player token).

At step 740, the data processing system may concatenate the extracted values. The data processing system may do so by placing the extracted words in sequence to create a concatenated value comprising a string of words. The data processing system may place the words in sequence starting from the top line (e.g., the top field) of a face (e.g., a pre-determined face) of the player token and iteratively adding values to the string going down the face of the player token until reaching the last field of the face. For example, the data processing system may create the concatenated value from the player identification, player name, level, token identifier, field values, etc. that are displayed on the token. In some implementations, the data processing system may be configured to convert the values from the front and back face of the token into a unique identifier. In such implementations, the data processing system may similarly add extracted values from both faces to the concatenated value.

At step 742, the data processing system may convert the concatenated value into a visual code. The visual code may be a code such as a visual code, barcode, QR code, steganographic code, a watermark, alphanumeric code, or other encoding of the UID for machine-readability that can uniquely identify the token as described above. The data processing system may convert the concatenated value into the visual code using a function (e.g., a hashing function) on the concatenated value and generate the visual code based on output of the function. At step 744, the data processing system may populate the token with the visual code. For example, the data processing system may place or append the visual code to a pre-designated portion of the back or front portion of the token.

At step 746, the data processing system may query the record and determine whether the record contains another image. If the data processing system determines the record contains another image, the data processing system may repeat steps 736-746 to generate visual codes for each image file until the data processing system determines the record does not contain any more image files.

At step 748, the data processing system may manufacture or print the tokens that were populated with the visual codes. For example, the data processing system may print tokens that comprise plastic or paper or otherwise manufacture tokens that comprise other items such as clothing, shoes, office equipment, cleaning equipment, etc. Upon being manufactured, in some implementations, the tokens may be activated.

Figure 8:
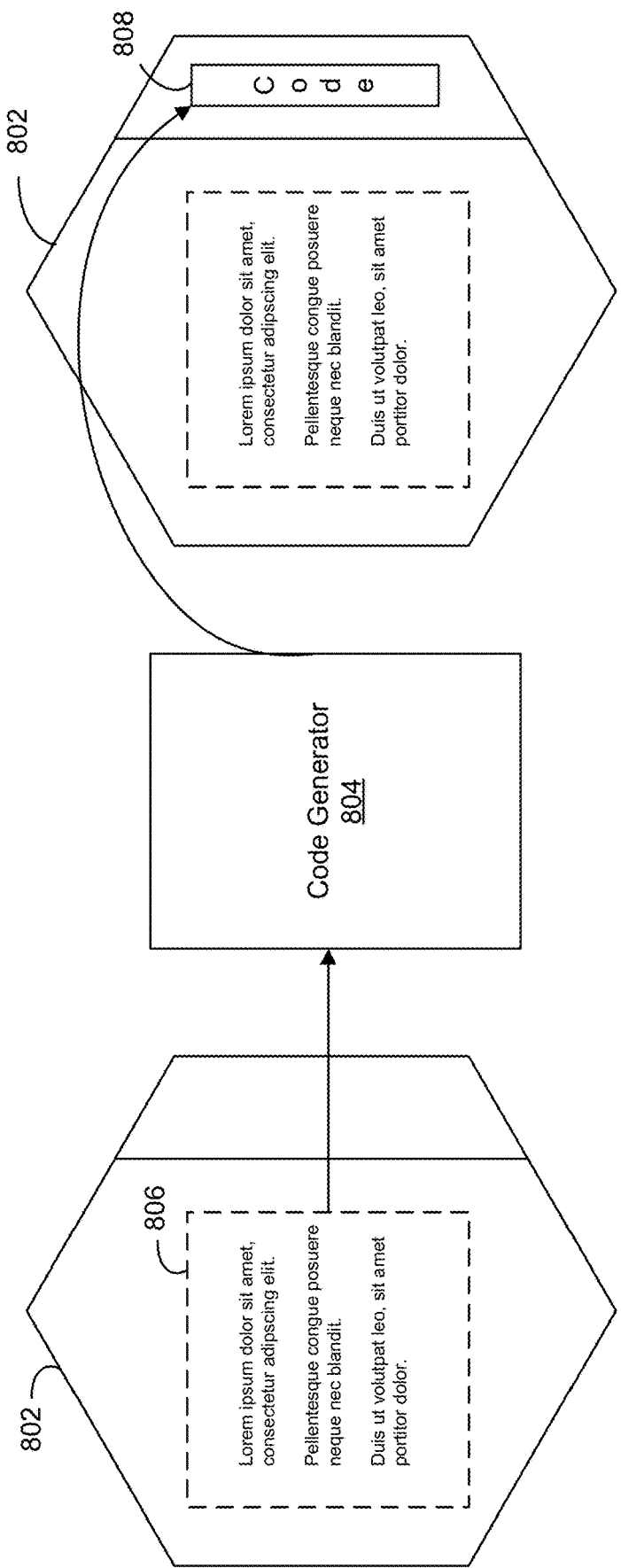
FIG. 8 is an illustration of an example sequence for automated visual code generation, according to some implementations.

FIG. 8 is an illustration of an example sequence for automated visual code generation. A token 802 populated with values from a spreadsheet may be input into a code generator 804. The code generator may be an application, service, server, daemon, routine, or other executable logic for generating visual code for tokens. The code generator 804 may receive the token 802 and use object recognition techniques (e.g., OCR techniques) on fields 806 of the token to extract values from the fields 806. The code generator 804 may extract values from the front and/or back of the token 802 and extract values from any text on the token. The code generator 804 may concatenate the extracted values into a string and use a function on the string to generate a new value. The code generator 804 may generate a visual code 808 from the new value and place the visual code 808 on the token 802 at a location designated for such codes. Accordingly, the data on the token 802 may be used to generate a visual code for the token 802 without transmitting or transferring any raw data that was originally used to generate the token 802 or relying on a human input directly onto the token 802.

In one aspect, a method for automatic visual code generation is described herein. The method may include receiving, by a first computing device, an identification of a file, the file comprising a plurality of arrays each comprising a plurality values corresponding to entity characteristics of a different entity and a token identifier; identifying, by the first computing device from the file, a plurality of blank virtual player tokens; for each of the plurality of blank virtual player tokens: extracting, by the first computing device, values from an array of the plurality of arrays; and populating, by the first computing device, blank fields of the blank virtual player token with the values based on the values originating at index values of the array that are associated with matching entity characteristics to the blank fields; and transmitting, by the first computing device, each of the populated virtual tokens to a second computing device, wherein, for each populated virtual token, the second computing device is configured to extract the values from the populated virtual token; perform a function on the extracted values to generate a visual code; and place the generated visual code on the populated virtual token.

C. Computing Environment

Having discussed specific embodiments of the present solution, it may be helpful to describe aspects of the operating environment as well as associated system components (e.g., hardware elements) in connection with the methods and systems described herein.

Figure 9A:
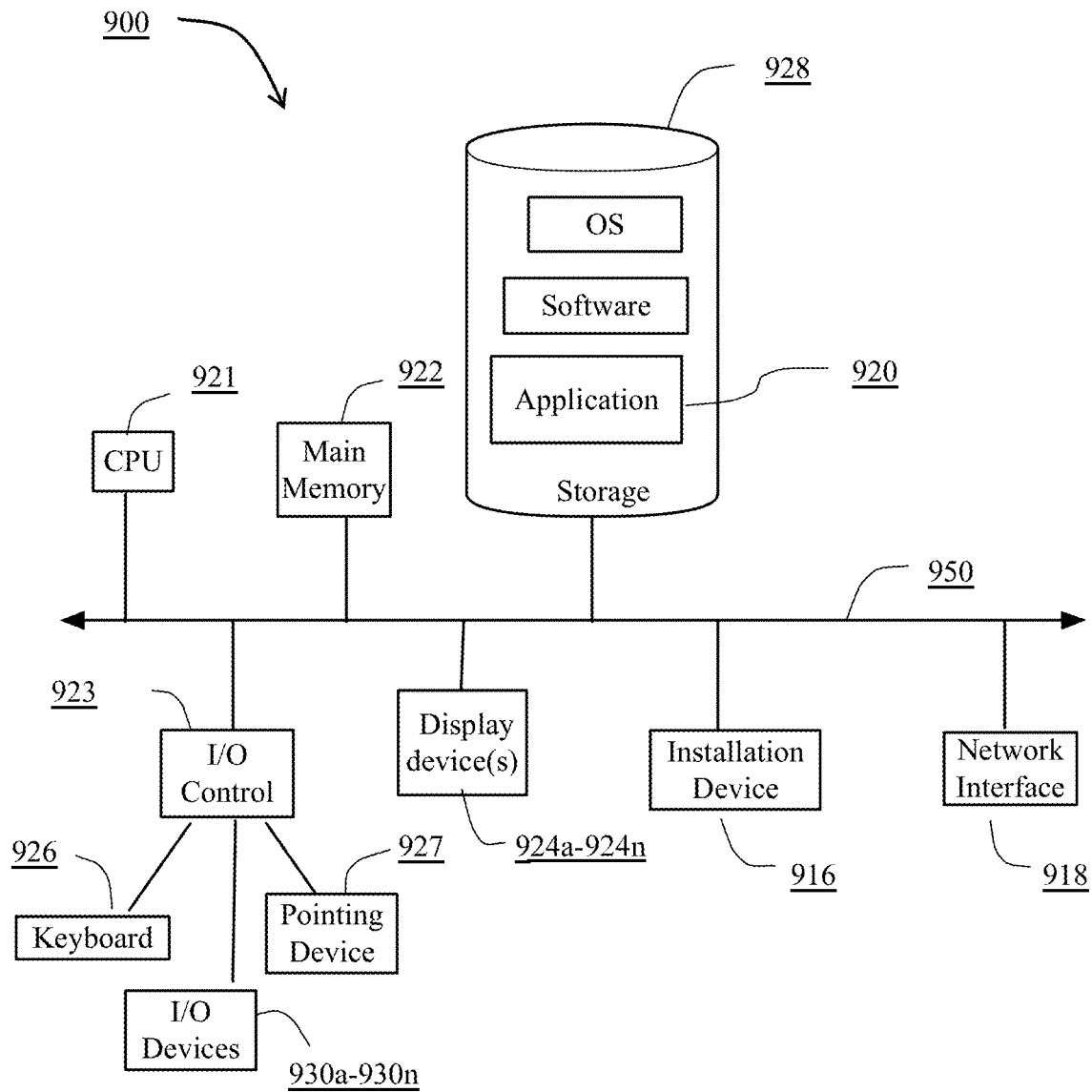
FIGS. 9A and 9B are block diagrams depicting embodiments of computing devices useful in connection with the methods and systems described herein.
Figure 9B:
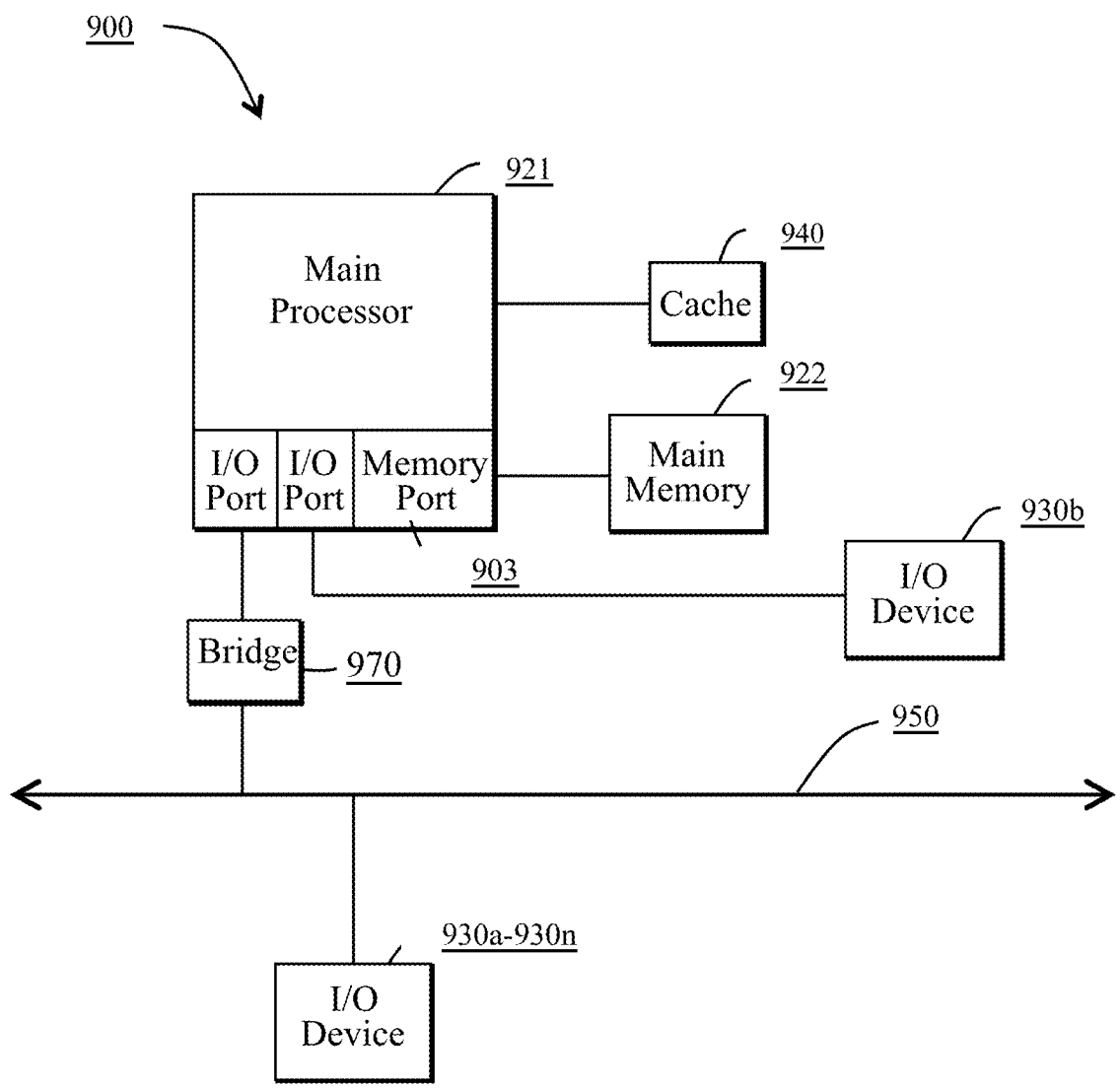

The systems discussed herein may be deployed as and/or executed on any type and form of computing device, such as a computer, network device or appliance capable of communicating on any type and form of network and performing the operations described herein. FIGS. 9A and 9B depict block diagrams of a computing device 900 useful for practicing an embodiment of the wireless communication devices 902 or the access point 906. As shown in FIGS. 9A and 9B, each computing device 900 includes a central processing unit 921, and a main memory unit 922. As shown in FIG. 9A, a computing device 900 may include a storage device 928, an installation device 916, a network interface 918, an I/O controller 923, display devices 924a-924n, a keyboard 926 and a pointing device 927, such as a mouse. The storage device 928 may include, without limitation, an operating system and/or software. As shown in FIG. 9B, each computing device 900 may also include additional optional elements, such as a memory port 903, a bridge 970, one or more input/output devices 930a-830n (generally referred to using reference numeral 930), and a cache memory 940 in communication with the central processing unit 921.

The central processing unit 921 is any logic circuitry that responds to and processes instructions fetched from the main memory unit 922. In many embodiments, the central processing unit 921 is provided by a microprocessor unit, such as: those manufactured by Intel Corporation of Mountain View, Calif.; those manufactured by International Business Machines of White Plains, N.Y.; or those manufactured by Advanced Micro Devices of Sunnyvale, Calif. The computing device 900 may be based on any of these processors, or any other processor capable of operating as described herein.

Main memory unit 922 may be one or more memory chips capable of storing data and allowing any storage location to be directly accessed by the microprocessor 921, such as any type or variant of Static random access memory (SRAM), Dynamic random access memory (DRAM), Ferroelectric RAM (FRAM), NAND Flash, NOR Flash and Solid State Drives (SSD). The main memory 922 may be based on any of the above described memory chips, or any other available memory chips capable of operating as described herein. In the embodiment shown in FIG. 9A, the processor 921 communicates with main memory 922 via a system bus 980 (described in more detail below). FIG. 9B depicts an embodiment of a computing device 900 in which the processor communicates directly with main memory 922 via a memory port 903. For example, in FIG. 9B the main memory 922 may be DRDRAM.

FIG. 9B depicts an embodiment in which the main processor 921 communicates directly with cache memory 940 via a secondary bus, sometimes referred to as a backside bus. In other embodiments, the main processor 921 communicates with cache memory 940 using the system bus 980. Cache memory 940 typically has a faster response time than main memory 922 and is provided by, for example, SRAM, BSRAM, or EDRAM. In the embodiment shown in FIG. 9B, the processor 921 communicates with various I/O devices 930 via a local system bus 980. Various buses may be used to connect the central processing unit 921 to any of the I/O devices 930, for example, a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 924, the processor 921 may use an Advanced Graphics Port (AGP) to communicate with the display 924. FIG. 9B depicts an embodiment of a computer 900 in which the main processor 921 may communicate directly with I/O device 930b, for example via HYPERTRANSPORT, RAPIDIO, or INFINIBAND communications technology. FIG. 9B also depicts an embodiment in which local busses and direct communication are mixed: the processor 921 communicates with I/O device 930a using a local interconnect bus while communicating with I/O device 930b directly.

A wide variety of I/O devices 930a-930n may be present in the computing device 900. Input devices include keyboards, mice, trackpads, trackballs, microphones, dials, touch pads, touch screen, and drawing tablets. Output devices include video displays, speakers, inkjet printers, laser printers, projectors and dye-sublimation printers. The I/O devices may be controlled by an I/O controller 923 as shown in FIG. 9A. The I/O controller may control one or more I/O devices such as a keyboard 926 and a pointing device 927, e.g., a mouse or optical pen. Furthermore, an I/O device may also provide storage and/or an installation medium 916 for the computing device 900. In still other embodiments, the computing device 900 may provide USB connections (not shown) to receive handheld USB storage devices such as the USB Flash Drive line of devices manufactured by Twintech Industry, Inc. of Los Alamitos, Calif.

Referring again to FIG. 9A, the computing device 900 may support any suitable installation device 916, such as a disk drive, a CD-ROM drive, a CD-R/RW drive, a DVD-ROM drive, a flash memory drive, tape drives of various formats, USB device, hard-drive, a network interface, or any other device suitable for installing software and programs. The computing device 900 may further include a storage device, such as one or more hard disk drives or redundant arrays of independent disks, for storing an operating system and other related software, and for storing application software programs such as any program or software 920 for implementing (e.g., configured and/or designed for) the systems and methods described herein. Optionally, any of the installation devices 916 could also be used as the storage device. Additionally, the operating system and the software can be run from a bootable medium.

Furthermore, the computing device 900 may include a network interface 918 to interface to the network 904 through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, IEEE 802.11n, IEEE 802.11ac, IEEE 802.11ad, CDMA, GSM, WiMax and direct asynchronous connections). In one embodiment, the computing device 900 communicates with other computing devices 900' via any type and/or form of gateway or tunneling protocol such as Secure Socket Layer (SSL) or Transport Layer Security (TLS). The network interface 918 may include a built-in network adapter, network interface card, PCMCIA network card, card bus network adapter, wireless network adapter, USB network adapter, modem or any other device suitable for interfacing the computing device 900 to any type of network capable of communication and performing the operations described herein.

In some embodiments, the computing device 900 may include or be connected to one or more display devices 924a-924n. As such, any of the I/O devices 930a-930n and/or the I/O controller 923 may include any type and/or form of suitable hardware, software, or combination of hardware and software to support, enable or provide for the connection and use of the display device(s) 924a-924n by the computing device 900. For example, the computing device 900 may include any type and/or form of video adapter, video card, driver, and/or library to interface, communicate, connect or otherwise use the display device(s) 924a-924n. In one embodiment, a video adapter may include multiple connectors to interface to the display device(s) 924a-924n. In other embodiments, the computing device 900 may include multiple video adapters, with each video adapter connected to the display device(s) 924a-924n. In some embodiments, any portion of the operating system of the computing device 900 may be configured for using multiple displays 924a-924n. One ordinarily skilled in the art will recognize and appreciate the various ways and embodiments that a computing device 900 may be configured to have one or more display devices 924a-924n.

In further embodiments, an I/O device 930 may be a bridge between the system bus 980 and an external communication bus, such as a USB bus, an Apple Desktop Bus, an RS-232 serial connection, a SCSI bus, a FireWire bus, a FireWire 900 bus, an Ethernet bus, an AppleTalk bus, a Gigabit Ethernet bus, an Asynchronous Transfer Mode bus, a FibreChannel bus, a Serial Attached small computer system interface bus, a USB connection, or a HDMI bus.

A computing device 900 of the sort depicted in FIGS. 9A and 9B may operate under the control of an operating system, which control scheduling of tasks and access to system resources. The computing device 900 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: Android, produced by Google Inc.; WINDOWS 7 and 8, produced by Microsoft Corporation of Redmond, Wash.; MAC OS, produced by Apple Computer of Cupertino, Calif.; WebOS, produced by Research In Motion (RIM); OS/2, produced by International Business Machines of Armonk, N.Y.; and Linux, a freely-available operating system distributed by Caldera Corp. of Salt Lake City, Utah, or any type and/or form of a Unix operating system, among others.

The computer system 900 can be any workstation, telephone, desktop computer, laptop or notebook computer, server, handheld computer, mobile telephone or other portable telecommunications device, media playing device, a gaming system, mobile computing device, or any other type and/or form of computing, telecommunications or media device that is capable of communication. The computer system 900 has sufficient processor power and memory capacity to perform the operations described herein.

In some embodiments, the computing device 900 may have different processors, operating systems, and input devices consistent with the device. For example, in one embodiment, the computing device 900 is a smart phone, mobile device, tablet or personal digital assistant. In still other embodiments, the computing device 900 is an Android-based mobile device, an iPhone smart phone manufactured by Apple Computer of Cupertino, Calif., or a Blackberry or WebOS-based handheld device or smart phone, such as the devices manufactured by Research In Motion Limited. Moreover, the computing device 900 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

Although the disclosure may reference one or more "users", such "users" may refer to user-associated devices or stations (STAs), for example, consistent with the terms "user" and "multi-user" typically used in the context of a multi-user multiple-input and multiple-output (MU-MIMO) environment.

Although examples of communications systems described above may include devices and APs operating according to an 802.11 standard, it should be understood that embodiments of the systems and methods described can operate according to other standards and use wireless communications devices other than devices configured as devices and APs. For example, multiple-unit communication interfaces associated with cellular networks, satellite communications, vehicle communication networks, and other non-802.11 wireless networks can utilize the systems and methods described herein to achieve improved overall capacity and/or link quality without departing from the scope of the systems and methods described herein.

It should be noted that certain passages of this disclosure may reference terms such as "first" and "second" in connection with devices, mode of operation, transmit chains, antennas, etc., for purposes of identifying or differentiating one from another or from others. These terms are not intended to merely relate entities (e.g., a first device and a second device) temporally or according to a sequence, although in some cases, these entities may include such a relationship. Nor do these terms limit the number of possible entities (e.g., devices) that may operate within a system or environment.

It should be understood that the systems described above may provide multiple ones of any or each of those components and these components may be provided on either a standalone machine or, in some embodiments, on multiple machines in a distributed system. In addition, the systems and methods described above may be provided as one or more computer-readable programs or executable instructions embodied on or in one or more articles of manufacture. The article of manufacture may be a floppy disk, a hard disk, a CD-ROM, a flash memory card, a PROM, a RAM, a ROM, or a magnetic tape. In general, the computer-readable programs may be implemented in any programming language, such as LISP, PERL, C, C++, C#, PROLOG, or in any byte code language such as JAVA. The software programs or executable instructions may be stored on or in one or more articles of manufacture as object code.

While the foregoing written description of the methods and systems enables one of ordinary skill to make and use what is considered presently to be the best mode thereof, those of ordinary skill will understand and appreciate the existence of variations, combinations, and equivalents of the specific embodiment, method, and examples herein. The present methods and systems should therefore not be limited by the above described embodiments, methods, and examples, but by all embodiments and methods within the scope and spirit of the disclosure.

What is claimed is:

1. A method, comprising:
    receiving, by an application executing on a computing device, a real-time video feed captured by an image-capture device;
    presenting, by the application, the real-time video feed on a display of the computing device;
    identifying, by the application, a first image on a first physical token and a second image on a second physical token from the real-time video feed;
    selecting, by the application, a first animation from a set of one or more animations based on the first identified image and a second animation from the set of one or more animation based on the second identified image;
    adding, by the application, the first animation to the real-time video feed at a first animation position above the first physical token and a second animation to the real-time video feed at a second animation position above the second physical token; and
    concurrently presenting, by the application on a display of the computing device, the added first animation and the added second animation in the real-time video feed, thereby enabling local dynamic configuration of display of an augmented reality environment.

2. The method of claim 1, wherein adding the first animation to the real-time video feed comprises:
    generating, by the application, a three-dimensional virtual environment;
    inserting, by the application, an indication of the first physical token at a virtual position within the three-dimensional virtual environment; and
    adding, by the application, the first animation to the three-dimensional virtual environment at the first animation position a first predetermined distance above the virtual position.

3. The method of claim 1, further comprising:
    retrieving, by the application, a token identifier for the first physical token from a centralized or distributed ledger using an identifier of a user account;
    selecting, by the application, the first animation from a memory of the computing device, responsive to the first animation being associated with the token identifier; and
    storing, by the application, the first animation in a cache of the computing device, wherein adding the first animation to the real-time video feed comprises retrieving, by the application, the first animation from the cache.

4. The method of claim 1, wherein adding the first animation to the real-time video feed comprises:
generating, by the application, an overlay comprising the first animation; and
placing, by the application, the overlay over the real-time video feed at the first animation position above the first physical token.

5. The method of claim 1, further comprising:
determining, by the application, that the first image is within a predetermined distance of the second image;
identifying, by the application, a third animation responsive to the determination that the first image is within the predetermined distance of the second image; and
replacing, by the application, the first animation with the third animation.

6. The method of claim 5, wherein replacing the first animation with the third animation comprises replacing, by the application, the first animation and the second animation with the third animation.

7. The method of claim 5, further comprising:
storing, by the application, a plurality of player profiles, each of the plurality of entity profiles corresponding to a different token image and having one or more attribute-value pairs at least including an animation attribute-value pair;
wherein identifying the first animation comprises identifying, by the application, the first animation from a first attribute-value pair of a first entity profile that corresponds to the first image, and
wherein identifying the third animation comprises identifying, by the application, the third animation from a third attribute-value pair of the first entity profile.

8. The method of claim 1, wherein selecting the first animation comprises:
comparing, by the application, the first identified image to one or more images in a database;
identifying, by the application, an entity profile of the first identified image responsive to determining the first identified image has a similarity to a corresponding image in the database that exceeds a threshold; and
selecting, by the application, the first animation from the entity profile.

9. A method, comprising:
receiving, by a first computing device in communication with a centralized or distributed ledger from a computing device associated with a first user account, a request to execute a transaction transferring ownership of a token from the first user account to a second user account, the request comprising a token identifier of the token;
retrieving, by the first computing device from a database separate from the centralized or distributed ledger, metadata about the token using the token identifier;
recording, by the first computing device on the centralized or distributed ledger, the transfer of ownership of the token from the first user account to the second user account in a record, the record comprising the token identifier and account identifiers of the first user account and the second user account;
receiving, by the first computing device from a third computing device, a history request for a chain of ownership of the token, the history request comprising the token identifier;
identifying, by the first computing device, records in the centralized or distributed ledger that comprise the token identifier;
retrieving, by the first computing device, account identifiers indicating the previous owners of the token from the identified records; and
transmitting, by the first computing device, the account identifiers to the third computing device responsive to the history request such that a user of the third computing device can view a history of the token's owners.

10. The method of claim 9, wherein retrieving the metadata about the token using the token identifier comprises:
searching, by the first computing device, the database for a key corresponding to the token identifier; and
retrieving, by the first computing device, a record corresponding to the key.

11. The method of claim 9, wherein retrieving the metadata about the token using the token identifier comprises updating, by the first computing device, an ownership field of a token record associated with the token stored in the database to include the account identifier of the second user account.

12. The method of claim 9, wherein the centralized or distributed ledger comprises a blockchain, and recording the transfer of ownership of the token by appending, by the first computing device, a block to the blockchain by generating a hash based at least on the token identifier and the account identifiers of the first and second user accounts, wherein the hash is not based on the metadata of the token.

13. The method of claim 9, wherein retrieving the metadata about the token comprises retrieving, by the first computing device, an entity identifier of an entity with which the token is associated and an entity type of the token.

14. The method of claim 13, wherein retrieving the metadata about the token further comprises retrieving, by the first computing device, an identifier of an add-on status for the token, the add-on status comprising a signature, an event, or a numerical value.

15. The method of claim 9, wherein retrieving the metadata about the token comprises retrieving one or more animations each depicting an entity associated with the token moving according to a set pattern.

16. The method of claim 9, further comprising transmitting the token identifier and the metadata about the token to a second computing device, receipt of the token identifier and the metadata causing the second computing device to store the token identifier and the metadata in an application.

17. A system, comprising:
a first computing device comprising a network interface in communication with a computing device associated with a first user account and a memory device storing a centralized or distributed ledger, and a processor configured to:
receive, via the network interface from the computing device associated with the first user account, a request to execute a transaction transferring ownership of a token from the first user account to a second user account, the request comprising a token identifier of the token;
retrieve, from a database separate from the centralized or distributed ledger, metadata about the token using the token identifier;
record, on the centralized or distributed ledger, the transfer of ownership of the token from the first user account to the second user account in a record, the record comprising the token identifier and account identifiers of the first user account and the second user account;

receiving, from a third computing device, a history request for a chain of ownership of the token, the history request comprising the token identifier;

identify records in the centralized or distributed ledger that comprise the token identifier;

retrieve account identifiers indicating the previous owners of the token from the identified records; and transmit the account identifiers to the third computing device responsive to the history request such that a user of the third computing device can view a history of the token's owners.

18. The system of claim 17, wherein the first computing device retrieves the metadata about the token using the token identifier by:

searching, by the first computing device, the database for a key corresponding to the token identifier; and retrieving, by the first computing device, a record corresponding to the key.

19. A non-transitory computer-readable medium storing instructions that cause one or more processors executing the instructions to:

receive a real-time video feed captured by an image-capture device;

present the real-time video feed on a display of the computing device;

identify a first image on a first physical token and a second image on a second physical token from the real-time video feed;

select a first animation from a set of one or more animations based on the first identified image and a second animation from the set of one or more animation based on the second identified image;

add the first animation to the real-time video feed at a first animation position above the first physical token and a second animation to the real-time video feed at a second animation position above the second physical token; and concurrently present, on a display of the computing device, the added first animation and the added second animation in the real-time video feed, thereby enabling local dynamic configuration of display of an augmented reality environment.

* * * * *